United States Patent
Wang et al.

(10) Patent No.: US 12,471,067 B2
(45) Date of Patent: Nov. 11, 2025

(54) METHOD AND APPARATUS FOR DETECTING A SIGNAL BASED ON A MULTIPLEXING FACTOR

(71) Applicant: Huawei Technologies Co., Ltd., Shenzhen (CN)

(72) Inventors: Yu Wang, Hangzhou (CN); Hejia Luo, Hangzhou (CN); Yunfei Qiao, Hangzhou (CN); Rong Li, Hangzhou (CN); Jun Wang, Hangzhou (CN); Bin Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 18/064,109

(22) Filed: Dec. 9, 2022

(65) Prior Publication Data

US 2023/0107174 A1 Apr. 6, 2023

Related U.S. Application Data

(63) Continuation of application No. PCT/CN2021/097052, filed on May 29, 2021.

(30) Foreign Application Priority Data

Jun. 11, 2020 (CN) .......................... 202010531209.6

(51) Int. Cl.
*H04W 72/04* (2023.01)
(52) U.S. Cl.
CPC ................................ *H04W 72/04* (2013.01)

(58) Field of Classification Search
CPC . H04W 72/04; H04W 72/0453; H04W 72/20; H04W 72/0446; H04W 72/12; H04W 16/14; H04L 5/001; H04L 5/0053
See application file for complete search history.

(56) References Cited

U.S. PATENT DOCUMENTS

| | | | |
|---|---|---|---|
| 2015/0358996 A1* | 12/2015 | Fang | H04L 1/0088 370/280 |
| 2018/0234931 A1 | 8/2018 | Ly et al. | |
| 2019/0335423 A1* | 10/2019 | Wu | H04W 72/0453 |

(Continued)

FOREIGN PATENT DOCUMENTS

| | | |
|---|---|---|
| EP | 2860995 B1 | 1/2018 |
| WO | 2019203526 A1 | 10/2019 |

OTHER PUBLICATIONS

Maria Rita Palattella et al, Internet of Things in the 5G Era: Enablers, Architecture and Business Models, IEEE Journal on Selected Areas in Communications (vol. 34, Issue: 3, Mar. 2016), Feb. 3, 2016, total 17 pages.

(Continued)

*Primary Examiner* — Rushil P. Sampat
(74) *Attorney, Agent, or Firm* — Slater Matsil, LLP

(57) ABSTRACT

Embodiments of this application provide a communication method and apparatus. In the method, a terminal device receives a first signal, and detects F frames of the first signal to obtain a first resource. F may be a multiplexing factor, such as a frequency/polarization multiplexing factor. The terminal device performs detection based on a frame number of the first resource to obtain a second resource. The first resource and the second resource may be a same resource.

20 Claims, 16 Drawing Sheets

(56) References Cited

U.S. PATENT DOCUMENTS

2021/0345333 A1* 11/2021 Jiang ................ H04L 5/001
2023/0379899 A1* 11/2023 Wu ................ H04B 7/0626

OTHER PUBLICATIONS

Ericsson: "Spot beam versus cell in NTN NR", 3GPP Oraft; R2-1814931 Spotbeam Versus Cell in NTN NR, 3rd Generation Partnership Project (3GPP), Mobile Competence Centre ; 650, Route Des Lucioles ; F-06921 Sophia-Antipolis Cedex ; France, vol. RAN WG2, no. Chengdu, China; Oct. 8, 2018-Oct. 12, 2018, Sep. 27, 2018 (Sep. 27, 2018) , XP051524309, Total 6 pages.
Andreas Hoglund et al., Overview of 3GPP Release 14 Enhanced NB-IoT, IEEE Network ( vol. 31, Issue: 6), Nov. 27, 2017, total 7 pages.
3GPP TSG RAN Meeting #86 RP-193264, New WID on Rel-17 enhancements for NB-IoT and LTE-MTC, Huawei, HiSilicon, Dec. 9-12, 2019, total 5 pages.
Jun Xu et al, Narrowband Internet of Things: Evolutions, Technologies, and Open Issues, IEEE Internet of Things Journal ( vol. 5, Issue: 3, Jun. 2018), Dec. 14, 2017, total 13 pages.
Mauro De Sanctis et al, Satellite Communications Supporting Internet of Remote Things, IEEE Internet of Things Journal ( vol. 3, Issue: 1, Feb. 2016), total 11 pages.
3GPP TSG RAN Meeting #86 RP-193235, New Study WID on NB-IoT/eTMC support for NTN, MediaTek Inc., Dec. 9-31, 2019, total 4 pages.
Y.-P. Eric Wang et al, A Primer on 3GPP Narrowband Internet of Things, IEEE Communications Magazine ( vol. 55, Issue: 3), Mar. 13, 2017, total 7 pages.
3GPP TS36.211 V15.8.0, Evolved Universal Terrestrial Radio Access (E-UTRA); Physical channels and modulation, Dec. 2019, total 239 pages.

* cited by examiner

| | Frame 0 | Frame 1 | Frame 2 | Frame 3 | Frame 4 | Frame 5 | Frame 6 | Frame 7 | Frame 8 |
|---|---|---|---|---|---|---|---|---|---|
| Cell 1 | First resource | | | Second resource | | | Second resource | | |
| Cell 2 | | First resource | | | Second resource | | | Second resource | |
| Cell 3 | | | First resource | | | Second resource | | | Second resource |

FIG. 7

| | Subframe 0 | ... | Subframe 5 | ... | Subframe 9 |
|---|---|---|---|---|---|
| Frame 0 | NPBCH block (block) 1 | | NPSS | | NSSS |
| Frame 1 | | | | | |
| Frame 2 | | | | | |
| Frame 3 | | | | | |
| Frame 4 | NPBCH block (block) 1 | | NPSS | | |
| Frame 5 | | | | | |
| Frame 6 | | | | | |
| Frame 7 | | | | | |

FIG. 8A

|  | Subframe 0 | ... | Subframe 5 | ... | Subframe 9 |
|---|---|---|---|---|---|
| Frame 0 | NPBCH block (block) 1 | | NPSS | | |
| Frame 1 | | | | | NSSS |
| Frame 2 | | | | | |
| Frame 3 | | | | | |
| Frame 4 | NPBCH block (block) 1 | | NPSS | | |
| Frame 5 | | | | | |
| Frame 6 | | | | | |
| Frame 7 | | | | | |

FIG. 8B

| | Subframe 0 | ... | Subframe 5 | ... | Subframe 9 |
|---|---|---|---|---|---|
| Frame 0 | | | | | |
| Frame 1 | | | | | |
| Frame 2 | NPBCH block (block) 1 | | NPSS | | NSSS |
| Frame 3 | | | | | |
| Frame 4 | | | | | |
| Frame 5 | | | | | |
| Frame 6 | NPBCH block (block) 1 | | NPSS | | |
| Frame 7 | | | | | |

FIG. 8C

|  | Subframe 0 | ... | Subframe 5 | ... | Subframe 9 |
|---|---|---|---|---|---|
| Frame 0 | | | | | |
| Frame 1 | | | | | |
| Frame 2 | | | | | |
| Frame 3 | NPBCH block (block) 1 | | NPSS | | NSSS |
| Frame 4 | | | | | |
| Frame 5 | | | | | |
| Frame 6 | | | | | |
| Frame 7 | NPBCH block (block) 1 | | NPSS | | |

FIG. 8D

|  | Subframe 0 | ... | Subframe 5 | ... | Subframe 9 |
|---|---|---|---|---|---|
| Frame 0 | NPBCH block (block) 1 | | NPSS | | NSSS |
| Frame 1 | | | | | |
| Frame 2 | | | | | |
| Frame 3 | NPBCH block (block) 1 | | NPSS | | |
| Frame 4 | | | | | |
| Frame 5 | | | | | |

FIG. 9A

|  | Subframe 0 | ... | Subframe 5 | ... | Subframe 9 |
|---|---|---|---|---|---|
| Frame 0 | | | | | |
| Frame 1 | NPBCH block (block) 1 | | NPSS | | NSSS |
| Frame 2 | | | | | |
| Frame 3 | | | | | |
| Frame 4 | NPBCH block (block) 1 | | NPSS | | |
| Frame 5 | | | | | |

FIG. 9B

|        | Subframe 0 | ... | Subframe 5 | ... | Subframe 9 |
|--------|------------|-----|------------|-----|------------|
| Frame 0 | | | | | |
| Frame 1 | | | | | |
| Frame 2 | NPBCH block (block) 1 | | NPSS | | NSSS |
| Frame 3 | | | | | |
| Frame 4 | | | | | |
| Frame 5 | NPBCH block (block) 1 | | NPSS | | |

FIG. 9C

|  | Subframe 0 | ... | Subframe 5 | ... | Subframe 9 |
|---|---|---|---|---|---|
| Frame 0 | NPBCH block (block) 1 | | NPSS | | |
| Frame 1 | | | NPSS | | NSSS |
| Frame 2 | | | | | |
| Frame 3 | | | | | |
| Frame 4 | NPBCH block (block) 1 | | | | |
| Frame 5 | | | | | |
| Frame 6 | | | | | |
| Frame 7 | | | | | |
| Frame 8 | NPBCH block (block) 1 | | NPSS | | |
| Frame 9 | | | NPSS | | NSSS |

FIG. 10

METHOD AND APPARATUS FOR DETECTING A SIGNAL BASED ON A MULTIPLEXING FACTOR

CROSS-REFERENCE TO RELATED APPLICATIONS

This application is a continuation of International Application No. PCT/CN2021/097052, filed on May 29, 2021, which claims priority to Chinese Patent Application No. 202010531209.6, filed on Jun. 11, 2020. The disclosures of the aforementioned applications are hereby incorporated by reference in their entireties.

TECHNICAL FIELD

This application relates to the field of wireless communication technologies, and in particular, to a communication method and apparatus.

BACKGROUND

A non-terrestrial network (NTN) has significant advantages such as global coverage, long-distance transmission, flexible networking, convenient deployment, and not limited by a geographical condition, and is widely used in many fields such as maritime communication, positioning navigation, disaster relief, scientific experiments, video broadcasting, and earth observation.

An internet of things (IoT) is a global infrastructure of an information society, and provides a better service by connecting physical and virtual objects. The internet of things is characterized by enhanced coverage, low power consumption, low costs, and a large connection compared with human-to-human-oriented communication of a conventional cellular network. Therefore, the internet of things is combined with the NTN, so that a service requirement of an internet of things terminal can be better met.

In a conventional technology, an internet of things protocol supports the following three deployment modes: (1) independent deployment that is applicable to a global system for mobile communications (GSM) frequency band and occupies one GSM frequency band; (2) guard band deployment in which an IoT network is deployed by using an unused bandwidth resource in a long term evolution (LTE) edge guard band; and (3) in-band deployment in which an IoT network is deployed by using any resource block (PRB) in an LTE carrier.

All the foregoing three IoT network deployment manners are based on a full-frequency multiplexing design of a terrestrial cellular network. However, if the foregoing three deployment manners are used in an NTN IoT network, interference to a cell edge may be relatively large, and a broadcast signal block cannot be reliably received.

SUMMARY

This application provides a communication method and apparatus, to reduce interference between beams and ensure reliable resource transmission.

According to a first aspect, an embodiment of this application provides a communication method. The method may be performed by a communication apparatus in embodiments of this application. The communication apparatus may be a terminal device, or may be another apparatus that has a similar function to the terminal device. In this method, the communication apparatus may receive a first signal, and detect F frames of the first signal to obtain a first resource. F herein may be a multiplexing factor, such as a frequency/polarization multiplexing factor. The communication apparatus may perform detection based on a frame number of the first resource to obtain a second resource. The first resource and the second resource may be a same resource.

Based on this solution, the communication apparatus may detect the first signal based on a multiplexing factor of a network device, to obtain the first resource and the second resource. With different multiplexing factors, the communication apparatus detects that frame numbers of the first resource and the second resource are different, so that inter-cell interference can be reduced, and reliable signal transmission can be ensured.

In a possible implementation, the first resource may include at least one of the following: a narrowband primary synchronization signal (NPSS), a narrowband secondary synchronization signal (NSSS), or a narrowband physical broadcast channel (NPBCH).

Based on this solution, the communication apparatus may detect the first signal based on the multiplexing factor of the network device, to obtain the NPSS, the NSSS, or the NPBCH. With different multiplexing factors, frame numbers of the NPSS, the NSSS, or the NPBCH in the first signal may be different, and therefore, frame numbers detected by the communication apparatus are different. In this way, inter-cell interference can be reduced, and reliable transmission of the NPSS, the NSSS, or the NPBCH can be ensured.

In a possible implementation, the communication apparatus may detect the F frames of the first signal to obtain the NPSS. The communication apparatus may obtain the NSSS and the NPBCH based on the NPSS. For example, the communication apparatus may perform blind detection on the first signal and detect the F frames of the first signal, to obtain the NPSS. In this case, the communication apparatus may obtain information such as a frame number of the NPSS, and the communication apparatus may determine frame numbers of the NSSS and the NPBCH based on the frame number of the NPSS, and detect the frame numbers of the NSSS and the NPBCH to obtain the NSSS and the NPBCH.

Based on this solution, the communication apparatus may determine the frame numbers of NSSS and the NPBCH based on the frame number of the NPSS, and may detect the frame numbers of the NSSS and the NPBCH to obtain the NSSS and the NPBCH. When performing detection, the communication apparatus may perform detection based on a relationship between the frame numbers of the NPSS, the NSSS, and the NPBCH, so that complexity of frame number detection of the communication apparatus can be reduced.

In a possible implementation, the NPSS, the NSSS, and the NPBCH are in a same frame of the first signal. For example, the communication apparatus may perform blind detection on the first signal and detect the F frames of the first signal. In this case, the communication apparatus may obtain information such as the frame number of the NPSS. The communication apparatus may detect the frame number of the NPSS to obtain the NSSS and the NPBCH. The NPSS may be carried in a subframe 5, the NSSS may be carried in a subframe 9, and the NPBCH may be carried in a subframe 0.

Based on this solution, the NPSS, the NSSS, and the NPBCH are in a same frame of the first signal. When obtaining the NPSS through detection, the communication apparatus may obtain the NSSS and the NPBCH by detecting the frame number of the NPSS, so that complexity of frame number detection of the communication apparatus can be reduced.

In a possible implementation, the communication apparatus may obtain the second resource in an $(N1+F*N)^{th}$ frame. N1 is the frame number of the first resource, N is a positive integer, and N=1, 2, . . . . For example, the communication apparatus detects the F frames of the first signal, and obtains the first resource in an $N1^{th}$ frame. Therefore, the communication apparatus may detect the $(N1+F*N)^{th}$ frame to obtain the second resource.

Based on this solution, when detecting the second resource, the communication apparatus may detect the first signal based on the frame number of the first resource, and may not need to detect each frame of the first signal, so that detection complexity of the communication apparatus can be reduced. In addition, due to different multiplexing factors, frame numbers of the second resource that are detected by the communication apparatus are different, so that inter-cell interference can be reduced.

For example, F may be 3, or F is 4. For example, the communication apparatus may detect three frames of the first signal, and obtain the first resource in a frame 0. The communication apparatus may further detect the first signal, and detect a third frame, a sixth frame, and a $(3*N)^{th}$ frame of the first signal to obtain the second resource.

Based on this solution, when detecting the first resource, the communication apparatus may detect the F frames of the first signal to obtain the first resource, and perform detection in the $(N1+F*N)^{th}$ frame based on a frame number N1 of the first resource to obtain the second resource. Due to different multiplexing factors, frame numbers of the second resource that are detected by the communication apparatus are different, so that inter-cell interference can be reduced.

In a possible implementation, the multiplexing factor F is related to a physical cell identifier (physical cell identifier, PCI) of the network device. For example, each PCI may correspond to one multiplexing factor, and PCIs with a same multiplexing factor may carry different frame numbers of the first resource in the F frames of the first signal. For example, a multiplexing factor of a cell 1 may be 4, and the first resource may be carried in a frame 0 of the first signal; and a multiplexing factor of a cell 2 may be 4, and the first resource may be carried in a frame 1 of the first signal.

Based on this solution, the communication apparatus may obtain the multiplexing factor of the network device by using the PCI of the network device, to detect the first signal based on the multiplexing factor and the frame number of the first resource to obtain the second resource.

In a possible implementation, the communication apparatus may detect time domain symbols of the F frames of the first signal to obtain the first resource. The communication apparatus may further detect the first signal based on the frame number of the first resource and the time domain symbol to obtain the second resource. For example, the communication apparatus detects the time domain symbols of the F frames of the first signal to obtain the first resource, and the first resource is on time domain symbols 3, 4, and 7 of the frame 0. The communication apparatus may determine a frame number of the second resource based on the frame 0, and detect time domain symbols 3, 4, and 7 of the frame number of the second resource, to obtain the second resource.

Based on this solution, time domain dilution may be performed on the first resource and the second resource; to be specific, the first resource and the second resource are carried only on a specified time domain symbol, and the time domain symbol that carries the first resource and the second resource may be related to the multiplexing factor. Therefore, inter-cell signal interference can be reduced.

In a possible implementation, the communication apparatus may detect subcarriers of the F frames of the first signal to obtain the first resource. The communication apparatus may further detect the first signal based on the frame number of the first resource and the subcarrier to obtain the second resource. For example, the communication apparatus may detect the subcarriers of the F frames of the first signal to obtain the first resource, and the first resource is on subcarriers (1, 2) of the frame 0. The communication apparatus may determine a frame number of the second resource based on the frame 0, and detect subcarriers (1, 2) of the frame number of the second resource, to obtain the second resource.

Based on this solution, frequency domain dilution may be performed on the first resource and the second resource; to be specific, the first resource and the second resource are carried only on a specified subcarrier, and the subcarrier that carries the first resource and the second resource may be related to the multiplexing factor. Therefore, inter-cell signal interference can be reduced.

According to a second aspect, an embodiment of this application further provides a communication method. The method may be performed by a network device in embodiments of this application, or may be performed by another device that has a similar function to the network device. In this method, the network device may send a first signal. F frames of the first signal carry a first resource, the first signal further carries a second resource, a frame number of the first resource is related to a frame number of the second resource, and F is a multiplexing factor.

Based on this solution, the network device may add the first resource to the F frames of the first signal based on the multiplexing factor, and determine, based on the frame number of the first resource, a frame number of a frame that carries the second resource, so that frame numbers of frames that carry the first resource and the second resource are different when multiplexing factors are different. In this way, inter-cell signal interference can be reduced.

In a possible implementation, the first resource may include at least one of the following: an NPSS, an NSSS, or an NPBCH. It should be understood that the second resource and the first resource may be a same resource. Therefore, the second resource may also be at least one of the NPSS, the NSSS, or the NPBCH. The first resource and the second resource may be any one of or any combination of the NPSS, the NSSS, or the NPBCH.

Based on this solution, the network device may ensure reliable transmission of the NPSS, the NSSS, or the NPBCH, and reduce inter-cell signal interference when transmitting the NPSS, the NSSS, or the NPBCH.

In a possible implementation, the NPSS, the NSSS, and the NPBCH are in a same frame of the first signal. For example, a subframe 0 of a frame 0 of the first signal may carry the NPBCH, a subframe 5 of the frame 0 may carry the NPSS, and a subframe 9 of the frame 0 may carry the NSSS. A subframe that carries the first resource may be specified in a protocol.

Based on this solution, the network device may add the NPSS, the NSSS, and the NPBCH to a same frame. In this way, a communication apparatus may detect only one frame to obtain the NPSS, the NSSS, and the NPBCH, so that resource detection complexity of the communication apparatus can be reduced.

In a possible implementation, the second resource is carried in an $(N1+F*N)^{th}$ frame, where N1 is the frame number of the first resource, F is the multiplexing factor, and N is a positive integer. For example, the first resource is carried in a frame A of the first signal, and therefore, the second resource is carried in a frame A+F*N of the first signal.

Based on this solution, the network device may determine, based on the frame number N1 of the first resource and the foregoing expression N1+F*N, the frame number of the frame that carries the second resource, so that the frame number of the second resource is related to the frame number of the first resource and the multiplexing factor F. In this way, frame numbers of frames that carry the second resource may be different when multiplexing factors F are different, so that signal interference between cells with different multiplexing factors F can be reduced.

In a possible implementation, the frame number N1 of the first resource may be related to a physical cell identifier. For example, N1 and the physical cell identifier PCI may meet the following formula: N1=PCI mod F, where mod represents a modulo operation. For example, a PCI of a cell 1 is 4, a PCI of a cell 2 is 6, and multiplexing factors F of both the cell 1 and the cell 2 are 3. Therefore, N1_1=4 mod 3=1 of the cell 1 may be obtained through calculation by using the foregoing formula. Therefore, a frame 1 of a first signal of the cell 1 carries the first resource. N1_2=6 mod 3=0 of the cell 2 may also be obtained through calculation by using the foregoing formula. Therefore, a frame 0 of a first signal of the cell 2 carries the first resource.

Based on this solution, a frame number of a frame that carries the first resource may be determined based on a PCI of the network device. Because the frame number of the first resource is different when the PCI is different, the frame number of the second resource may also be different, so that signal interference between different cells can be reduced.

In a possible implementation, the multiplexing factor F may be related to the physical cell identifier of the network device. For example, one physical cell identifier may be bound to one F, or a plurality of physical cell identifiers may be bound to one F.

Based on this solution, the multiplexing factor F may be related to the PCI of the network device. Therefore, different cells may correspond to different F, so that signal interference between different cells in transmitting the first resource and the second resource can be reduced.

In a possible implementation, a specified time domain symbol of the F frames of the first signal carries the first resource. Therefore, a specified time domain symbol of an $(N1+F*N)^{th}$ frame of the first signal may carry the second resource. For example, when the multiplexing factor F is 3, a third time domain symbol and a fourth time domain symbol of the frame 0 of the first signal carry the first resource. Therefore, a third time domain symbol and a fourth time domain symbol of a $(0+3*N)^{th}$ frame of the first signal carry the second resource.

Based on this solution, the first resource and the second resource may be transmitted in a time domain dilution manner. Because time domain symbols used by different cells to transmit the first resource and the second resource are different, signal interference between different cells in transmitting the first resource and the second resource can be reduced.

In a possible implementation, a specified subcarrier of the F frames of the first signal carries the second resource. Therefore, a specified subcarrier of an $(N1+F*N)^{th}$ frame of the first signal may carry the second resource. For example, when the multiplexing factor F is 3, subcarriers (1, 2) of the frame 0 of the first signal carry the first resource. Therefore, subcarriers (1, 2) of a $(0+3*N)^{th}$ frame of the first signal carry the second resource.

Based on this solution, the first resource and the second resource may be transmitted in a frequency domain dilution manner. Because subcarriers used by different cells to transmit the first resource and the second resource are different, signal interference between different cells in transmitting the first resource and the second resource can be reduced.

According to a third aspect, an embodiment of this application further provides a communication apparatus, and the communication apparatus may be configured to implement operations in the first aspect and any possible implementation of the first aspect. For example, the communication apparatus may include a module or a unit configured to perform each operation in the first aspect or any possible implementation of the first aspect. For example, the communication apparatus may include a processing unit and a communication unit.

According to a fourth aspect, an embodiment of this application further provides a communication apparatus, and the communication apparatus may be configured to implement operations in the second aspect and any possible implementation of the second aspect. For example, the communication apparatus may include a module or a unit configured to perform each operation in the second aspect or any possible implementation of the second aspect. For example, the communication apparatus may include a processing unit and a communication unit.

According to a fifth aspect, an embodiment of this application provides a chip system, including a processor. Optionally, the chip system may further include a memory. The memory stores a computer program, and the processor is configured to invoke the computer program from the memory and run the computer program, so that a communication apparatus on which the chip system is installed performs any method in the first aspect or any possible implementation of the first aspect, and/or the communication apparatus on which the chip system is installed performs any method in the second aspect or any possible implementation of the second aspect.

According to a sixth aspect, an embodiment of this application further provides a communication system. The communication system may include the communication apparatus according to the third aspect and/or the communication apparatus according to the fourth aspect.

According to a seventh aspect, an embodiment of this application provides a computer program product, including computer program code. When the computer program code is run by a communication unit and a processing unit, or a transceiver and a processor of a communication apparatus, the communication apparatus is enabled to perform any method in the first aspect or any possible implementation of the first aspect, and/or the communication apparatus is enabled to perform any method in the second aspect or any possible implementation of the second aspect.

According to an eighth aspect, an embodiment of this application provides a computer-readable storage medium. The computer-readable storage medium stores a program, and the program enables a communication apparatus to perform any method in the first aspect or any possible implementation of the first aspect, and/or enables the communication apparatus to perform any method in the second aspect or any possible implementation of the second aspect.

For technical effects that may be achieved in the third aspect to the eighth aspect, refer to the technical effects that may be brought by each design in the first aspect or the second aspect. Details are not repeatedly described herein again.

BRIEF DESCRIPTION OF THE DRAWINGS

FIG. 7 is a schematic diagram of a first signal according to an embodiment of this application;
FIG. 8A is a schematic diagram of a first signal according to an embodiment of this application;
FIG. 8B is a schematic diagram of a first signal according to an embodiment of this application;
FIG. 8C is a schematic diagram of a first signal according to an embodiment of this application;
FIG. 8D is a schematic diagram of a first signal according to an embodiment of this application;
FIG. 9A is a schematic diagram of a first signal according to an embodiment of this application;
FIG. 9B is a schematic diagram of a first signal according to an embodiment of this application;
FIG. 9C is a schematic diagram of a first signal according to an embodiment of this application;
FIG. 10 is a schematic diagram of a first signal according to an embodiment of this application.

DETAILED DESCRIPTION OF ILLUSTRATIVE EMBODIMENTS

Figure 1:
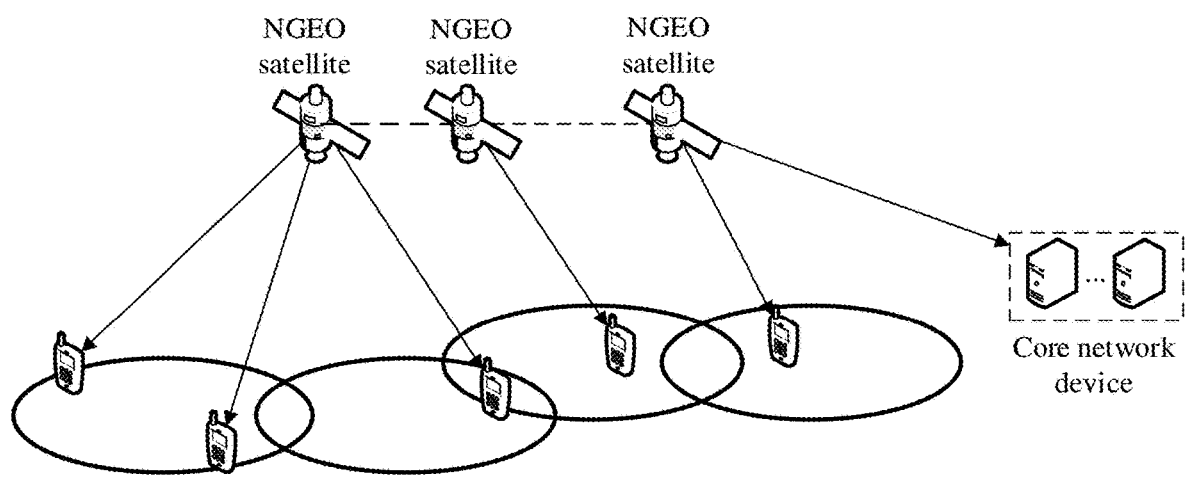
FIG. 1 is a schematic diagram of a satellite communication system according to an embodiment of this application.

To make objectives, technical solutions, and advantages of embodiments of this application clearer, the following further describes embodiments of this application in detail with reference to the accompanying drawings.

The following describes some terms in embodiments of this application, to facilitate understanding of a person skilled in the art.

(1) A multiplexing factor F means that every F adjacent network devices multiplex a same resource in a dimension such as frequency or polarization, where $F=i^2+ij+j^2$, and i and j are non-negative integers.

(2) A frame number is also referred to as a system frame number (SFN). For example, a value range of an SFN of any cell may be from 0 to 4095, and an SFN of each frame is increased by 1. After an SFN is 4095, an SFN of a next frame is changed to 0. A cycle is repeated in this way. For another example, a value range of an SFN of a cell may be from 0 to 1023, and an SFN of each frame is increased by 1. After an SFN is 1023, an SFN of a next frame is changed to 0. A cycle is repeated in this way. A value of the SFN of the cell may be predefined based on a standard. This is not specifically limited in this application.

It should be noted that a frame number of a first signal mentioned in embodiments of this application, such as a frame 0, a frame 1, or a frame 2, is an example, and cannot represent that the frame number of the first signal in practice is the frame 0, the frame 1, or the frame 2. In addition, a time domain symbol 1, a time domain symbol 2, or a time domain symbol 3 and a subcarrier 1, a subcarrier 2, a subcarrier 3, or the like mentioned in embodiments of this application are also examples, and cannot represent a number of a time domain symbol or a number of a subcarrier in practice.

In addition, in embodiments of this application, "a plurality of" means two or more. In addition, it should be understood that in descriptions of this application, terms such as "first" and "second" are merely used for distinguishing and description, but should not be understood as indicating or implying relative importance, or should not be understood as indicating or implying a sequence.

It should be understood that, in embodiments of this application, the word "example" is used to indicate an example, an instance, or descriptions. Any embodiment or implementation described as an "example" in this application should not be construed as being more preferred or advantageous than other embodiments or implementations. To be specific, use of the word "example" is intended to present a concept in a specific manner.

For ease of understanding embodiments of this application, a communication system shown in FIG. 1 is first used as an example to describe in detail a communication system applicable to embodiments of this application. FIG. 1 is a schematic diagram of an architecture of a possible satellite communication system to which this application is applicable. If the satellite communication system is compared with a terrestrial communication system, a satellite may be considered as one or more terrestrial network devices, such as a base station, an access point 1, an access point 2, or even an access point 3 to an access point n (not shown in the figure). The satellite provides a communication service for a terminal device, and the satellite may further be connected to a core network device (such as an AMF). The satellite may be a non-geostationary earth orbit (NGEO) satellite or a geostationary earth orbit (GEO) satellite. This application may also be applied to the terrestrial communication system.

A satellite base station mainly provides a radio access service for the terminal device, schedules a radio resource to an accessed terminal device, and provides a reliable radio transmission protocol, a data encryption protocol, and the like. The satellite base station is a base station that uses an artificial earth satellite, a high-altitude aircraft, and the like for wireless communication, such as an evolved NodeB (eNB) or a base station (gNB) in a fifth generation (5G) communication system. The satellite base station may be a geostationary earth orbit (GEO) satellite, a medium earth orbit (MEO) satellite and a low earth orbit (LEO) satellite that are in a none-geostationary earth orbit (NGEO), or a high-altitude platform station (HAPS). Running postures of a satellite device include an earth-moving posture and an earth-fixed posture. A satellite beam transmitted by a satellite device in the earth-moving posture moves with the satellite, and for a satellite, an angle of each beam transmitted by the satellite does not change with time. A fixed point on the ground experiences relatively frequent beam switching in a period of time in which the satellite passes through the top. For example, a flashlight simulates motion of a satellite orbit around a tellurion, and an angle of a beam emitted by the flashlight remains unchanged. In addition, a speed of the satellite device is faster than a speed of earth rotation, and therefore, except a synchronous satellite, a relationship between a satellite in a stationary orbit and the Earth may be imagined as follows: The Earth remains still and the satellite device performs periodic circular motion around the Earth. Therefore, the beam emitted by the flashlight can orbit the tellurion by one round. For a fixed satellite system, the angle of each beam transmitted by the satellite is adjusted in a specific manner, to implement continuous observation of the fixed point on the ground. For example, the flashlight simulates motion of the satellite orbit around the tellurion. In a running process of the flashlight, continuous observation for a same area is implemented by adjusting an angle at which each beam is emitted (an area illuminated by the flashlight remains unchanged). It may be understood that an angle of each beam emitted by the flashlight is adjustable.

The communication apparatus in this application may be a terminal device, and the terminal device includes a device that provides voice and/or data connectivity for a user. Specifically, a device that provides voice for the user is included, a device that provides data connectivity for the user is included, or a device that provides voice and data connectivity for the user is included. For example, a handheld device with a wireless connection function or a processing device connected to a wireless modem may be included. The terminal may communicate with a core network by using a radio access network (RAN), and exchange voice or data with the RAN, or interact voice and data with the RAN. The terminal may include user equipment (UE), a wireless terminal, a mobile terminal, a device-to-device communication (D2D) terminal, a vehicle-to-everything (V2X) terminal, a machine-to-machine/machine-type communication (M2M/MTC) terminal, an internet of things (IoT) terminal, a subscriber unit, a subscriber station, a mobile station, a remote station, an access point (AP), a remote terminal, an access terminal, a user terminal, a user agent, or a user device. For example, a mobile phone (or referred to as a "cellular" phone), a computer with a mobile terminal, or a portable, pocket-sized, handheld, or computer built-in mobile apparatus may be included. For example, the terminal device may be a device such as a personal communication service (PCS) phone, a cordless telephone set, a session initiation protocol (SIP) phone, a wireless local loop (WLL) station, or a personal digital assistant (PDA). The terminal device alternatively includes a limited device, for example, a device having low power consumption, a device having a limited storage capability, or a device having a limited computing capability. For example, the terminal device includes an information sensing device such as a barcode, radio frequency identification (radio frequency identification, RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, bands, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a broad sense, wearable intelligent devices include full-featured and large-sized devices that can implement complete or partial functions without depending on smartphones, for example, smart watches or smart glasses, and devices that focus on only one type of application function and need to work with other devices such as smartphones, for example, various smart bands, smart helmets, or smart jewelry for monitoring physical signs.

If the various terminals described above are located in a vehicle (for example, placed in the vehicle or installed in the vehicle), the terminals may be all considered as vehicle-mounted terminals. For example, the vehicle-mounted terminal is also referred to as an on board unit (OBU).

In embodiments of this application, an apparatus configured to implement a function of the terminal device may be a terminal, or may be an apparatus that can support the terminal in implementing the function, for example, a chip system, and the apparatus may be mounted in the terminal. In this embodiment of this application, the chip system may include a chip, or may include a chip and another discrete component. In the technical solutions provided in embodiments of this application, a terminal is used as an example of an apparatus configured to implement a function of the terminal, to describe the technical solutions provided in embodiments of this application.

For ease of understanding of embodiments of this application, an application scenario of this application is described below. A service scenario described in embodiments of this application is intended to describe the technical solutions of embodiments of this application more clearly, and does not constitute a limitation on the technical solutions provided in embodiments of this application. It may be learned by a person of ordinary skill in the art that, with the emergence of a new service scenario, the technical solutions provided in embodiments of this application are also applicable to a similar technical problem.

Figure 2:
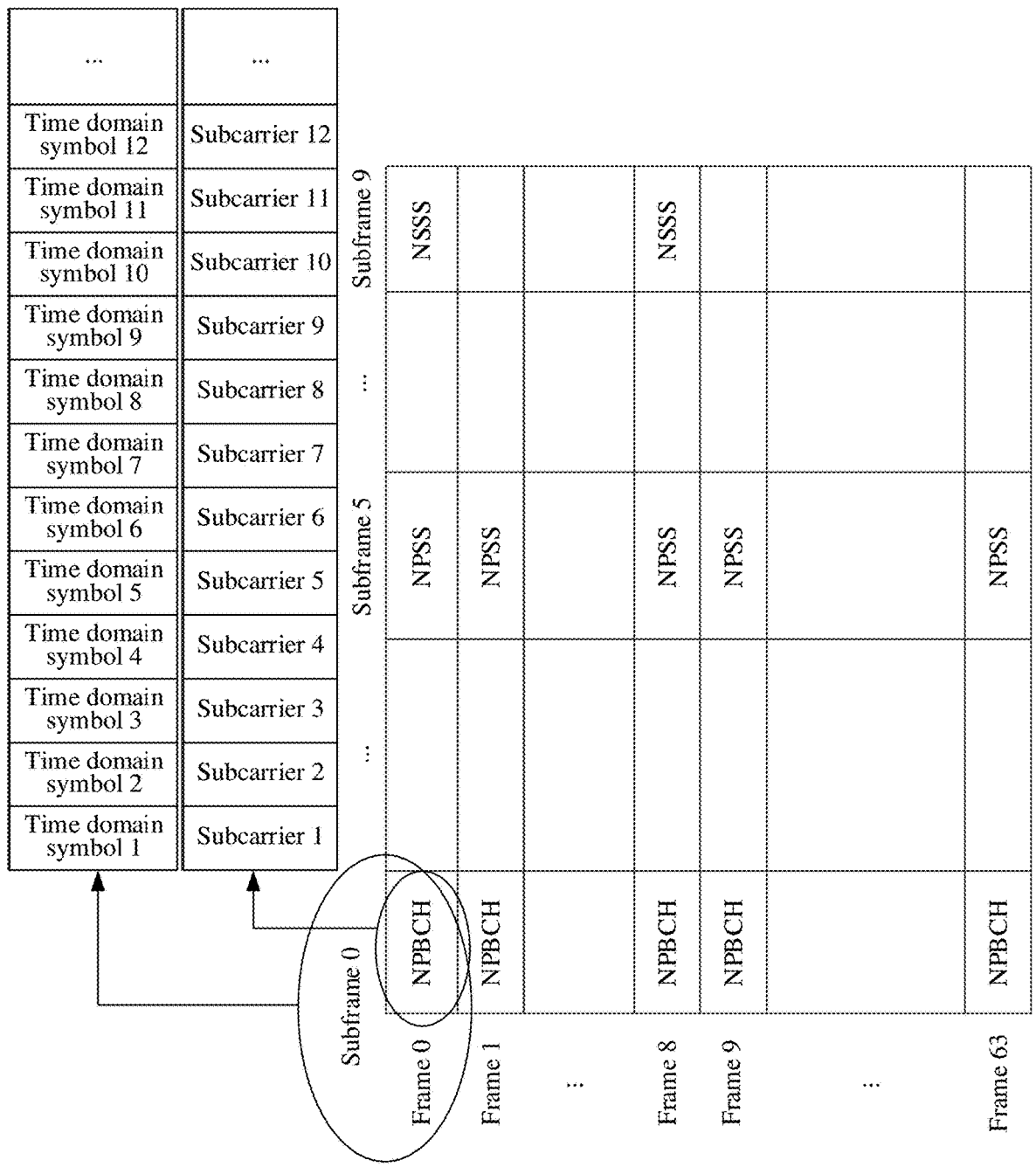
FIG. 2 is a schematic diagram of a transmission manner of a first resource and a second resource in a conventional technology.

As shown in FIG. 2, a current manner of transmitting broadcast information is as follows:

Narrowband primary synchronization signal (NPSS): A periodicity of the narrowband primary synchronization signal is 10 ms, and the narrowband primary synchronization signal is transmitted in a subframe 5 of each frame, occupies 11 symbols in time domain, and occupies 11 subcarriers in frequency domain.

Narrowband secondary synchronization signal (NSSS): A periodicity of the narrowband secondary synchronization signal is 20 ms, and the narrowband secondary synchronization signal is transmitted in a subframe 9 of each even-numbered frame (such as a frame 0 or a frame 8 in FIG. 1), occupies 11 symbols in time domain, and occupies bandwidth of an entire physical resource block (PRB) in frequency domain, that is, 12 subcarriers.

Narrowband physical broadcast channel (narrowband physical broadcast channel, NPBCH): A periodicity of the narrowband physical broadcast channel is 640 ms, and the narrowband physical broadcast channel is transmitted in a subframe 0 of each frame, occupies 11 symbols in time domain, and occupies bandwidth of an entire PRB in frequency domain, that is, 12 subcarriers. In one periodicity, the NPBCH is transmitted in eight transport blocks, and content of each transport block is different. After content of each transport block is repeatedly transmitted for eight consecutive times, a next transport block is transmitted. As shown in FIG. 1, a first transport block may be transmitted in a frame 0 to a frame 7, a second transport block may be transmitted in a frame 8 to a frame 15, and so on, so that all the eight transport blocks of the NPBCH are transmitted.

It can be learned that an existing method for transmitting broadcast information is a full-frequency multiplexing method. However, in a satellite communication network, a plurality of beams are configured in one satellite, and each beam may be considered as a beam in a cell or as a separate cell. Because signal strength of a center position of a satellite beam is not much different from signal strength of an edge position, strong interference may occur between adjacent beams if full-frequency multiplexing is used for communication. Therefore, in a satellite communication system, multi-color multiplexing (including frequency multiplexing and polarization multiplexing) is usually used to reduce interference between satellite beams. For example, in a time unit T1, four beams 0, 1, 4, and 5 correspond to different frequency bands. For example, system bandwidth may be equally divided into four frequency bands, and center frequencies of the frequency bands are respectively f1, f2, f3, and f4, and in this case, the beams 0, 1, 4, and 5 respectively correspond to frequency bands whose center frequencies are f1, f2, f3, and f4. Adjacent beams in the satellite communicate with the terminal device at different frequencies, so that an interference suppression effect can be achieved.

However, if the multi-color multiplexing manner is used and broadcast information is transmitted at different frequencies, strong interference may still exist in transmission of broadcast information between cells, and reliable transmission of the broadcast information may not be ensured.

In view of this, an embodiment of this application provides a communication method. The technical solutions in embodiments of this application may be applied to various communication systems, for example, a terrestrial communication system or a non-terrestrial communication system such as a satellite communication system. The satellite communication system may be integrated with a conventional mobile communication system. For example, the mobile communication system may be a fourth generation (4G) communication system (for example, a long term evolution (LTE) system), an internet of things communication system, a worldwide interoperability for microwave access (WiMAX) communication system, a 5G communication system (for example, a new radio (NR) system), and a future mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

Figures 3, 4:
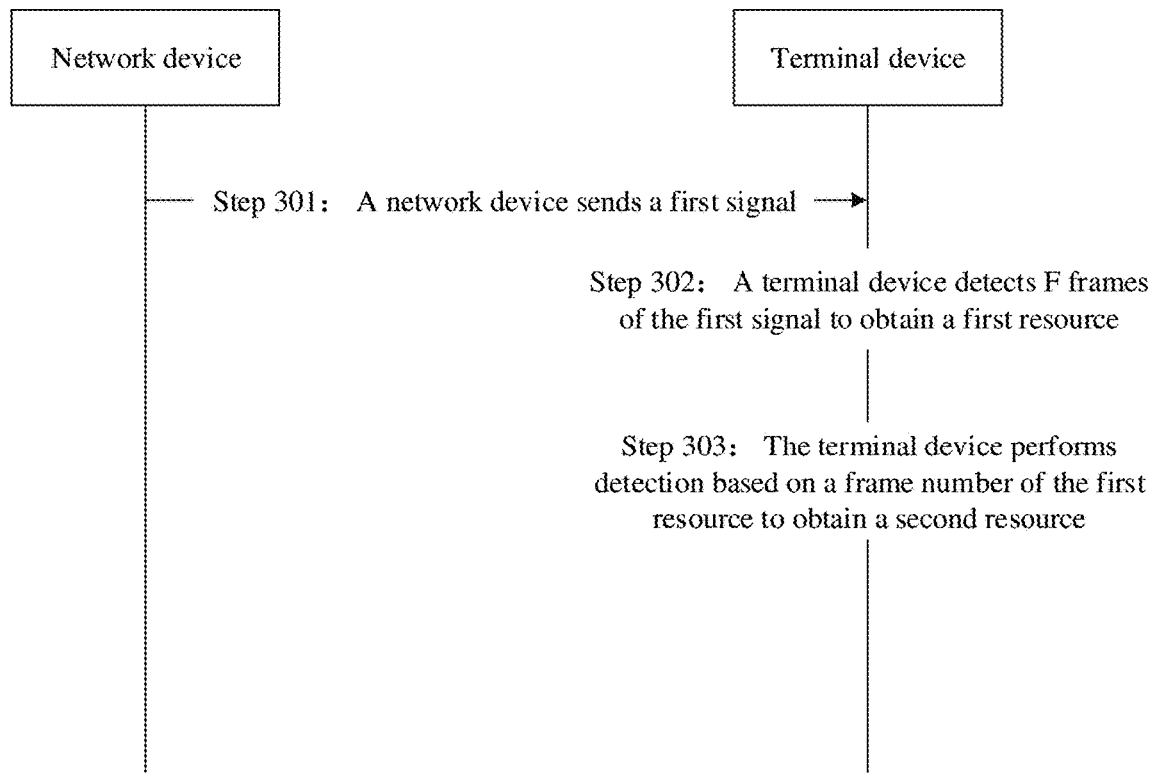
FIG. 3 is an example flowchart of a communication method according to an embodiment of this application.
FIG. 4 is a schematic diagram of a first signal according to an embodiment of this application.

Generally, a terminal device is used as an example of a communication apparatus below to describe a communication method provided in an embodiment of this application. It should be understood that the communication apparatus in this embodiment of this application may alternatively be another device with a similar function to the terminal device. When the another device communicates with a network device, the another device may also communicate with the network device by using the communication method provided in this embodiment of this application. FIG. 3 is an example flowchart of a communication method according to an embodiment of this application from a perspective of device interaction. As shown in FIG. 3, the method may include the following steps.

Step 301: A network device sends a first signal. Correspondingly, a terminal device receives the first signal.

F frames of the first signal may carry a first resource. The first signal may be carried in one of a frame 0 to a frame f of the first signal. As shown in FIG. 4, a frame 1 in four frames: a frame 0 to a frame 3 of the first signal carries the first resource.

In addition, it should be noted that a multiplexing factor F of the network device is preconfigured. For example, the multiplexing factor F may be bound to a physical cell identifier (PCI) of the network device. One PCI may be bound to one multiplexing factor F, or a plurality of PCIs may be bound to one multiplexing factor F. Alternatively, the multiplexing factor F may be bound to a unique identifier of the network device, and one unique identifier may be bound to one multiplexing factor F, or a plurality of unique identifiers may be bound to one multiplexing factor F. In addition, the multiplexing factor F of the network device may alternatively be predefined based on a standard.

Figure 5:
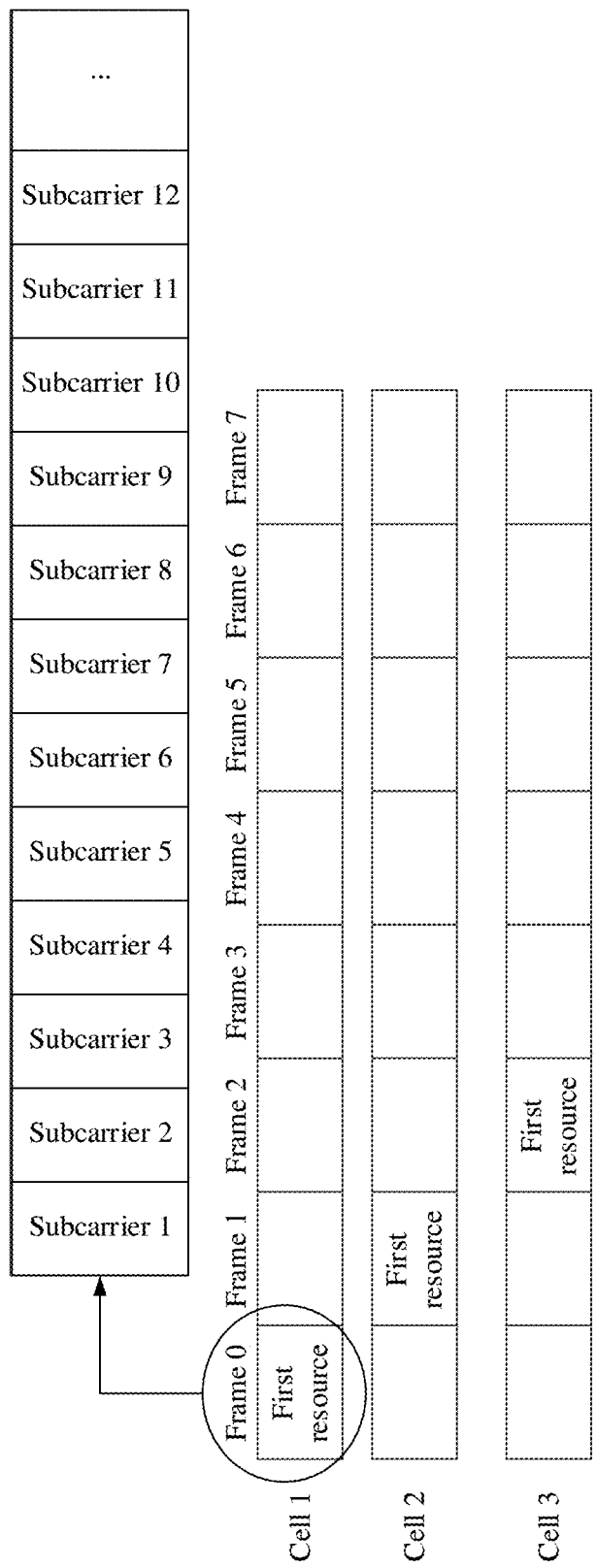
FIG. 5 is a schematic diagram of a first signal according to an embodiment of this application.

Frame numbers of frames that are in first signals of adjacent network devices with a same multiplexing factor F and that carry the first resource may be different. As shown in FIG. 5, multiplexing factors F of a cell 1, a cell 2, and a cell 3 are all 3, the cell 1 is adjacent to the cell 2, and the cell 2 is adjacent to the cell 3. A frame 0 in a first signal of the cell 1 carries the first resource, a frame 1 in a first signal of the cell 2 carries the first resource, and a frame 2 in a first signal of the cell 3 carries the first resource. It should be understood that frame numbers of frames that are in first signals of every F adjacent network devices and that carry the first resource may be the same. For example, the cell 1 is adjacent to the cell 2, the cell 2 is adjacent to the cell 3, the cell 3 is adjacent to a cell 4, the cell 4 is adjacent to a cell 5, and the cell 5 is adjacent to a cell 6. Multiplexing factors F of the cell 1 to the cell 6 are all 3. Therefore, frame numbers of frames that are in first signals of the cell 1 and the cell 4 and that carry the first resource may be the same. For example, the first resource may be carried in a frame 0. Frame numbers of frames that are in first signals of the cell 2 and the cell 5 and that carry the first resource may be the same. For example, the first resource may be carried in a frame 1. Frame numbers of frames that are in first signals of the cell 3 and the cell 6 and that carry the first resource may be the same. For example, the first resource may be carried in a frame 2.

In this embodiment of this application, the first signal may further carry a second resource, and a frame number of the second resource is related to the first resource. It should be understood that the second resource and the first resource may be a same resource.

An implementation in which the first signal carries the first resource and the second resource is specifically described below.

If an N1$^{th}$ frame of the first signal carries the first resource, the second resource is carried in an (N1+F*N)$^{th}$ frame of the first signal. N=1, 2, .... For example, the N1$^{th}$ frame of the first signal carries the second resource, and all an (N1+F)$^{th}$ frame, an (N1+2F)$^{th}$ frame, an (N1+3F)$^{th}$ frame, ..., and an (N1+F*N)$^{th}$ frame of the first signal may carry the second resource.

The frame number N1 of the first resource may be preconfigured. For example, the frame number N1 of the first resource may be bound to a unique identifier of the network device. One unique identifier may be bound to one N1, or a plurality of unique identifiers may be bound to one N1. Alternatively, the frame number N1 of the first resource may be predefined based on a standard. Alternatively, the frame number N1 of the first resource may also be related to the foregoing PCI. For example, N1 and the PCI may meet the following relationship:

N1=PCI mod F, where mod represents a modulo operation. As shown in FIG. 5, a PCI of the cell 1 in FIG. 5 is 6, a PCI of the cell 2 is 4, and a PCI of the cell 3 is 5. N1_1=6 mod 3=0 of the cell 1, N1_2=4 mod 3=1 of the cell 2, and N1_3=5 mod 3=2 of the cell 3 may be obtained through calculation based on the foregoing formula. Therefore, as shown in FIG. 5, a frame 0 of a first signal of the cell 1 may carry the first resource, a frame 1 of a first signal of the cell 2 may carry the first resource, and a frame 2 of a first signal of the cell 3 may carry the first resource. It should be understood that the value of the PCI is an example, and a PCI of the cell may be another value. This is not specifically limited in this application.

Figure 6:
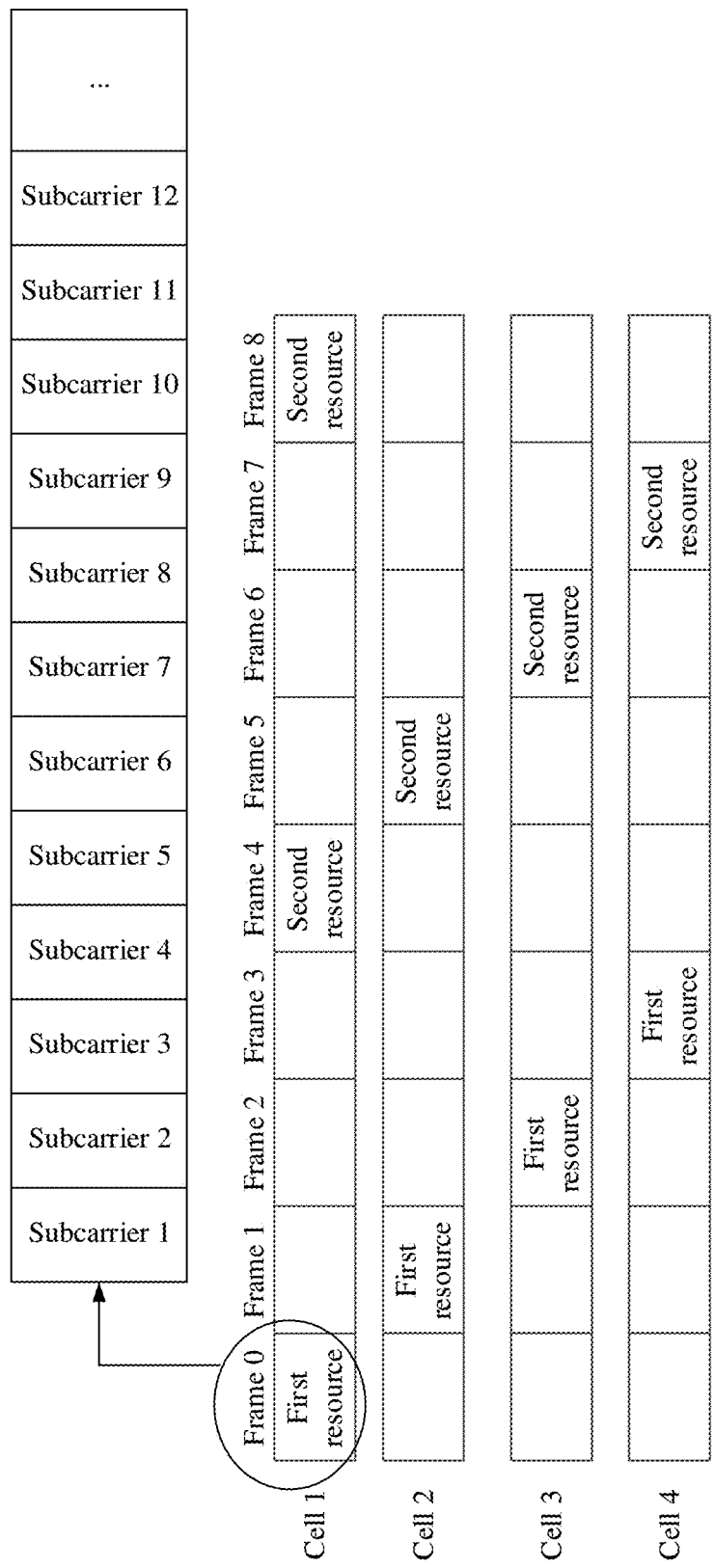
FIG. 6 is a schematic diagram of a first signal according to an embodiment of this application.

As shown in FIG. 6, multiplexing factors F of a cell 1, a cell 2, a cell 3, and a cell 4 are all 4, the cell 1 is adjacent to the cell 2, the cell 2 is adjacent to the cell 3, and the cell 3 is adjacent to the cell 4. A frame 0 of a first signal of the cell 1 carries the first resource. In this case, a (0+4*1)$^{th}$ frame, that is, a frame 4, of the first signal of the cell 1 carries the second resource, and a (0+4*2)$^{th}$ frame, that is, a frame 8, carries the second resource. By analogy, a frame 12 (not shown in the figure), a frame 16 (not shown in the figure), and a frame 0+4*N of the first signal of the cell 1 carry the second resource. A frame 1 of a first signal of the cell 2 carries the first resource. In this case, a (1+4*1)$^{th}$ frame, that is, a frame 5, of the first signal of the cell 2 carries the second resource. By analogy, a frame 9 (not shown in the figure), a frame 13 (not shown in the figure), a frame 17 (not shown in the figure), and a frame 1+4*N of the first signal of the cell 2 carry the second resource. A frame 2 of a first signal of the cell 3 carries the first resource, and a (2+4*1)$^{th}$ frame, that is, a frame 6, carries the second resource. By analogy, a frame 10 (not shown in the figure) and a frame 14 (not shown in the figure) of the first signal of the cell 3 carry the second resource. A frame 3 of a first signal of the cell 4 carries the first resource. In this case, a (3+4*1)$^{th}$ frame, that is, a frame 7, of the first signal of the cell 4 carries the second resource. By analogy, a frame 11, a frame 15, and a frame 3+4*N of the first signal of the cell 4 carry the second resource.

As shown in FIG. 7, multiplexing factors F of a cell 1, a cell 2, and a cell 3 are all 3, the cell 1 is adjacent to the cell 2, and the cell 2 is adjacent to the cell 3. A frame 0 of a first signal of the cell 1 carries the first resource. In this case, a (0+3*1)$^{th}$ frame, that is, a frame 3, of the first signal of the cell 1 carries the second resource, and a (0+3*2)$^{th}$ frame, that is, a frame 6, of the first signal of the cell 1 carries the second resource. By analogy, a frame 0+3*N of the first signal of the cell 1 carries the second resource. A frame 1 of a first signal of the cell 2 carries the first resource. In this case, a (1+3*1)$^{th}$ frame, that is, a frame 4, of the first signal of the cell 2 carries the second resource, and a (1+3*2)$^{th}$ frame, that is, a frame 7, of the first signal of the cell 2 carries the second resource. By analogy, a frame 1+3*N of the first signal of the cell 2 carries the second resource. A frame 2 of a first signal of the cell 3 carries the first resource. In this case, a (2+3*1)$^{th}$ frame, that is, a frame 5, of the first signal of the cell 3 carries the second resource, and a (2+3*2)$^{th}$ frame, that is, a frame 8, of the first signal of the cell 3 carries the second resource. By analogy, a frame 2+3*N of the first signal of the cell 3 carries the second resource.

In addition, it should be noted that the first resource and the second resource may be any one of or any combination of a narrowband primary synchronization signal (NPSS), a narrowband secondary synchronization signal (NSSS), or a narrowband physical broadcast channel (NPBCH). It should be understood that subframes that carry the first resource and the second resource may be specified in a protocol, or may be indicated by the network device. For example, the network device may indicate, by using first indication information, specific subframes in which the NPSS, the NSSS, and the NPBCH are separately carried.

FIG. 8A to FIG. 8D separately show first signals of a plurality of cells whose multiplexing factors F are 4. A cell 1 is adjacent to a cell 2, the cell 2 is adjacent to a cell 3, and the cell 3 is adjacent to a cell 4. As shown in FIG. 8A, a frame 0 of a first signal of the cell 1 carries the first resource. A subframe 0 of the frame 0 carries the NPBCH (specifically corresponding to a first data block of the NPBCH, that is, an NPBCH block 1), a subframe 5 of the frame 0 carries the NPSS, and a subframe 9 of the frame 0 carries the NSSS. Therefore, a (0+4*N)$^{th}$ frame, that is, a frame 4N, of the first signal of the cell 1 may carry the second resource. Considering different periodicities of the NPBCH, the NPSS, and the NSSS, in this implementation, a subframe 0 of the frame 4N carries the NPBCH, a subframe 5 of the frame 4N carries the NPSS, and a subframe 9 of a frame 4*2*N carries the NSSS. It can be learned that when F=4, a frame length is 10 ms, and corresponding periodicities of the NPBCH, the NPSS, and the NSSS are respectively 2560 ms, 40 ms, and 80 ms.

As shown in FIG. 8B, a frame 1 of a first signal of the cell 2 carries the first resource. A subframe 0 of the frame 1 carries the NPBCH, a subframe 5 of the frame 1 carries the NPSS, and a subframe 9 of the frame 1 carries the NSSS. Therefore, a (1+4*N)$^{th}$ frame, that is, a frame 1+4*N, of the first signal of the cell 2 may carry the second resource. A subframe 0 of the frame 1+4*N carries the NPBCH, a subframe 5 of the frame 1+4*N carries the NPSS, and a subframe 9 of a frame 1+4*2*N carries the NSSS.

As shown in FIG. 8C, a frame 2 of a first signal of the cell 3 carries the first resource. A subframe 0 of the frame 2 carries the NPBCH, a subframe 5 of the frame 2 carries the NPSS, and a subframe 9 of the frame 2 carries the NSSS. Therefore, a (2+4*N)$^{th}$ frame, that is, a frame 2+4*N, of the first signal of the cell 3 may carry the second resource. A subframe 0 of the frame 2+4*N carries the NPBCH, a subframe 5 of the frame 2+4*N carries the NPSS, and a subframe 9 of a frame 2+4*2*N carries the NSSS.

As shown in FIG. 8D, a frame 3 of a first signal of the cell 4 carries the first resource. A subframe 0 of the frame 3 carries the NPBCH, a subframe 5 of the frame 3 carries the NPSS, and a subframe 9 of the frame 3 carries the NSSS. Therefore, a (3+4*N)$^{th}$ frame, that is, a frame 3+4*N, of the first signal of the cell 4 may carry the second resource. A subframe 0 of the frame 3+4*N carries the NPBCH, a subframe 5 of the frame **3+4*N carries the NPSS, and a subframe 9 of a frame 3+4*2*N** carries the NSSS.

FIG. 9A to FIG. 9C separately show first signals of a plurality of cells whose multiplexing factors F are 3. A cell 1 is adjacent to a cell 2, and the cell 2 is adjacent to a cell 3. As shown in FIG. 9A, a frame 0 of a first signal of the cell 1 carries the first resource. A subframe 0 of the frame 0 carries the NPBCH (specifically corresponding to a first data block of the NPBCH, that is, an NPBCH block 1), a subframe 5 of the frame 0 carries the NPSS, and a subframe 9 of the frame 0 carries the NSSS. Therefore, a $(0+3*N)^{th}$ frame, that is, a frame 3N, of the first signal of the cell 1 carries the second resource. Considering different periodicities of the NPBCH, the NPSS, and the NSSS, in this implementation, a subframe 0 of the frame 3N carries the NPBCH, a subframe 5 of the frame 3N carries the NPSS, and a subframe 9 of a frame **3*2*N** carries the NSSS.

As shown in FIG. 9B, a frame 1 of a first signal of the cell 2 carries the first resource. A subframe 0 of the frame 1 carries the NPBCH, a subframe 5 of the frame 1 carries the NPSS, and a subframe 9 of the frame 1 carries the NSSS. Therefore, a $(1+3*N)^{th}$ frame, that is, a frame **1+3*N, of the first signal of the cell 2 carries the second resource. A subframe 0 of the frame 1+3*N carries the NPBCH, a subframe 5 of the frame 1+3*N carries the NPSS, and a subframe 9 of a frame 1+3*2*N** carries the NSSS.

As shown in FIG. 9C, a frame 2 of a first signal of the cell 3 carries the first resource. A subframe 0 of the frame 2 carries the NPBCH, a subframe 5 of the frame 2 carries the NPSS, and a subframe 9 of the frame 2 carries the NSSS. Therefore, a $(2+3*N)^{th}$ frame, that is, a frame **2+3*N, of the first signal of the cell 3 carries the second resource. A subframe 0 of the frame 2+3*N carries the NPBCH, a subframe 5 of the frame 2+3*N carries the NPSS, and a subframe 9 of a frame 2+3*2*N** carries the NSSS.

As shown in FIG. 8A to FIG. 8D and FIG. 9A to FIG. 9C, all the NPBCH, the NPSS, and the NSSS are in a same frame of the first signal. In this embodiment of this application, the NPBCH, the NPSS, and the NSSS may alternatively be in different frames of the first signal. FIG. 10 shows a first signal of a cell whose multiplexing factor F is 4. A frame 0 of a first signal of a cell 1 carries the NPBCH. Therefore, a $(0+4*1)^{th}$ frame, that is, a frame 4, of the first signal of the cell 1 carries the NPBCH. By analogy, a $(0+4N)^{th}$ frame, that is, a frame 4N, of the first signal of the cell 1 carries the NPBCH.

As shown in FIG. 10, the frame 0 and a frame 1 of the first signal of the cell 1 carry the NPSS. Therefore, a $(0+4*2)^{th}$ frame, that is, a frame 8, of the first signal of the cell 1 carries the NPSS, and a $(1+4*2)^{th}$ frame, that is, a frame 9, also carries the NPSS. Because two frames in F frames of the first signal carry the first resource, N in an $(N1+F*N)^{th}$ frame of the cell 1 needs to be (N+1); in other words, an $(N1+F*(N+1))^{th}$ frame of the first signal of the cell 1 carries the second resource. By analogy, if three frames in the F frames of the first signal carry the first resource, an $(N1+F*(N+2))^{th}$ frame of the first signal of the cell 1 carries the second resource. If M frames in the F frames of the first signal carry the first resource, an $(N1+F*(N+M-1))^{th}$ frame of the first signal of the cell 1 may carry the second resource. M is a positive integer. As shown in FIG. 10, the frame 1 of the first signal of the cell 1 carries the NSSS. Therefore, considering a periodicity of the NSSS, a $(1+4*2)^{th}$ frame, that is, a frame 9, of the first signal of the cell 1 carries the NSSS.

Figure 11:
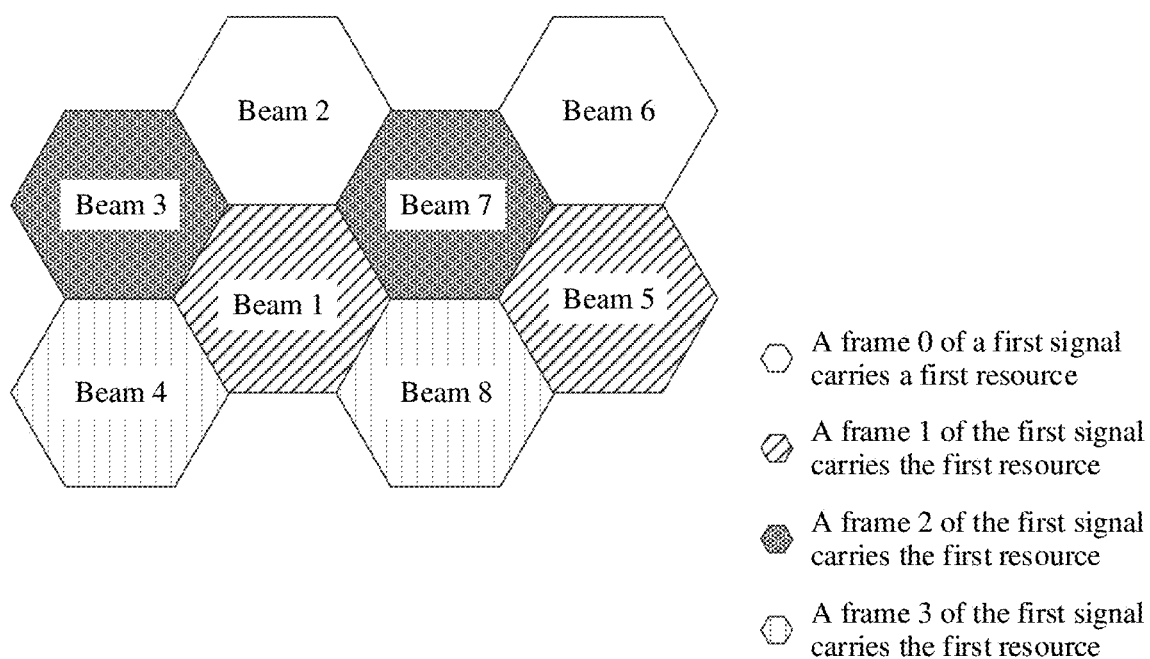
FIG. 11 is a schematic diagram of a transmission manner of a first signal of a satellite beam according to an embodiment of this application.

In addition, it should be noted that in a non-terrestrial communication system such as a satellite communication system, a satellite beam may correspond to a cell of the foregoing network device. FIG. 11 is a schematic diagram of an eight-beam satellite system. Multiplexing factors F of a beam 1 to a beam 8 are 4, frames that are in first signals of the beam 1 and a beam 2 and that carry the first resource may be the same, frames that are in first signals of a beam 3 and a beam 4 and that carry the first resource may be the same, frames that are in first signals of a beam 5 and a beam 6 and that carry the first resource may be the same, and frames that are in first signals of a beam 7 and the beam 8 and that carry the first resource may be the same.

In this embodiment of this application, the first resource may be carried in the first signal in a time domain dilution manner, for example, a specified time domain symbol in the F frames of the first signal carries the first resource.

For example, content transmitted in S1=(3, 4, 5, 6, 9, 10, 11)$^{th}$ time domain symbols by the NPSS is the same, and content transmitted in S2=(7, 8, 12)$^{th}$ time domain symbols is the same. Therefore, the S1$^{th}$ time domain symbol and the S2$^{th}$ time domain symbol may be combined, and the specified time domain symbol in the F frames carries the first resource. For example, when the multiplexing factor F is 3, third, fourth, and seventh time domain symbols of a frame A of a first signal of a cell 1 may carry the first resource, fifth, sixth, and eighth time domain symbols of a frame B of a first signal of a cell 2 may carry the first resource, and ninth, tenth, and twelfth time domain symbols of a frame C of a first signal of a cell 3 may carry the first resource. In this case, similarly, third, fourth, and seventh time domain symbols of a frame A+3*N of the cell 1 may carry the second resource, fifth, sixth, and eighth time domain symbols of a frame B+3*N of the first signal of the cell 2 may carry the second resource, and ninth, tenth, and twelfth time domain symbols of a frame C+3*N of the first signal of the cell 3 may carry the second resource.

Optionally, in this embodiment of this application, the foregoing time domain dilution manner may be further combined with a method for transmitting a first resource in a conventional technology. As shown in FIG. 2, there may be a plurality of time domain symbols in one subframe of each frame. The network device may add the first resource to a specified time domain symbol of a first frame of the first signal, that is, a specified time domain symbol of the frame 0. When the multiplexing factor F is 3, third, fourth, and seventh time domain symbols of a first frame of the first signal of the cell 1 may carry the first resource, fifth, sixth, and eighth time domain symbols of a first frame of the first signal of the cell 2 may carry the first resource, and ninth, tenth, and twelfth time domain symbols of a first frame of the first signal of the cell 3 may carry the first resource. Therefore, third, fourth, and seventh time domain symbols of each frame except the first frame of the cell 1 may carry the second resource, fifth, sixth, and eighth time domain symbols of each frame except the first frame of the cell 2 may carry the second resource, and ninth, tenth, and twelfth time domain symbols of each frame except the first frame of the cell 3 may carry the second resource. It should be understood that a periodicity of the second resource needs to be considered when the second resource is carried in a frame except the first frame of the first signal.

In another possible implementation, the first resource may alternatively be carried in the first signal in a frequency domain dilution manner, for example, the first resource is carried on a specified subcarrier in the F frames of the first signal.

For example, the NPSS occupies 11 subcarriers in frequency domain. Therefore, transmission bandwidth of the NPSS can be reduced in the frequency domain dilution manner. For example, as shown in FIG. 6, there are a plurality of subcarriers in one subframe of each frame. When the multiplexing factor F is 4, the first resource may be carried on subcarriers (1, 2) of a frame 0 of the cell 1, the first resource may be carried on subcarriers (4, 5) of a frame 1 of the cell 2, the first resource may be carried on subcarriers (7, 8) of a frame 2 of the cell 3, and the first resource may be carried on subcarriers (10, 11) of a frame 3 of the cell 4.

Therefore, similarly, the second resource may be carried on subcarriers (1, 2) of a frame **4*N of the cell 1, the second resource may be carried on subcarriers (4, 5) of a frame 1+4*N of the cell 2, the second resource may be carried on subcarriers (7, 8) of a frame 2+4*N of the cell 3, and the second resource may be carried on subcarriers (10, ii) of a frame 3+4*N of the cell 4**.

For another example, the NSSS occupies 12 subcarriers in frequency domain. Therefore, transmission bandwidth of the NSSS can be reduced in the frequency domain dilution manner. For example, as shown in FIG. 5, there are a plurality of subcarriers in one subframe of each frame. When the multiplexing factor F is 3, the first resource may be carried on subcarriers (1, 4, 7, 10) of a frame 0 of the cell 1, the first resource may be carried on subcarriers (2, 5, 8, ii) of a frame 1 of the cell 2, and the first resource may be carried on subcarriers (3, 6, 9, 10) of a frame 2 of the cell 3. Therefore, similarly, the second resource may be carried on subcarriers (1, 4, 7, 10) of a frame **3*N of the cell 1, the second resource may be carried on subcarriers (2, 5, 8, ii) of a frame 1+3*N of the cell 2, and the second resource may be carried on subcarriers (3, 6, 9, 10) of a frame 2+3*N of the cell 3**.

For example, the network device may transmit the first resource and the second resource by using a combination of the time domain dilution method and the frequency domain dilution method. For example, when the multiplexing factor F of the cell 1 is 3, third, fourth, and seventh time domain symbols and subcarriers (1, 2) of a frame A of a first signal of the cell 1 carry a first NPSS, and third, fourth, and seventh time domain symbols and subcarriers (1, 2) of a frame A+3*N of the first signal carry a second NPSS.

Optionally, in this embodiment of this application, the foregoing frequency domain dilution may be further combined with a method for transmitting a first resource in a conventional technology. As shown in FIG. 2, there may be a plurality of subcarriers and a plurality of time domain symbols in one subframe of each frame. The network device may add the first resource to a specified subcarrier in a first frame of the first signal. For example, when the multiplexing factor F is 3, the first resource may be carried on subcarriers (1, 4, 7, 10) of a first frame of the first signal of the cell 1, the first resource may be carried on subcarriers (2, 5, 8, 11) of a first frame of the cell 2, and the first resource may be carried on subcarriers (3, 6, 9, 10) of a first frame of the cell 3. Therefore, the second resource may be carried on subcarriers (1, 4, 7, 10) of each frame except the first frame of the first signal of the cell 1, the second resource may be carried on subcarriers (2, 5, 8, 11) of each frame except the first frame of the first signal of the cell 2, and the second resource may be carried on subcarriers (3, 6, 9, 10) of each frame except the first frame of the first signal of the cell 3.

Step 302: The terminal device detects the F frames of the first signal to obtain the first resource.

F herein may be a multiplexing factor of the network device. The terminal device may detect the F frames from a frame 0 to a frame f of the first signal to obtain the first resource. As shown in FIG. 4, the terminal device detects four frames from a frame 0 to a frame 3 of the first signal to obtain the first resource, and a frame number of the first resource is a frame 1.

In addition, it should be noted that F is the multiplexing factor of the network device. Different network devices may have a same multiplexing factor F, or different network devices may have different multiplexing factors F. For example, the multiplexing factor F may be bound to a physical cell identifier (physical cell identifier, PCI) of the network device. One PCI may be bound to one multiplexing factor F, or a plurality of PCIs may be bound to one multiplexing factor F. Therefore, the terminal device may obtain the PCI of the network device, and determine the multiplexing factor F of the network device, to detect the F frames of the first signal to obtain the first resource. The PCI herein may be sent by the network device to the terminal device. The PCI and the first signal may be sent by using same signaling, or the PCI and the first signal may be sent by using different signaling.

The first resource may be any one of or any combination of the NPSS, the NSSS, and the NPBCH. For example, the terminal device may detect the first signal to obtain the NPSS. The NPSS may include the physical cell identifier PCI of the network device. Therefore, the terminal device may determine the multiplexing factor F of the network device based on the PCI, and the terminal device may detect the F frames of the first signal to obtain the NSSS and/or the NPBCH. As shown in FIG. 10, the terminal device detects the first signal, and obtains the NPSS in the frame 0 and the frame 1. The terminal device may determine, based on the NPSS, that the multiplexing factor F of the network device is 4. Therefore, the terminal device may detect four frames of the first signal, obtain the NPBCH in the frame 0, and obtain the NSSS in the frame 1.

For another example, the NPSS, the NSSS, and the NPBCH may be in a same frame of the first signal. Therefore, the terminal device may detect the first signal to obtain the NPSS, the NSSS, and the NPBCH. It should be understood that subframes that carry the NPSS, the NSSS, and the NPBCH may be specified in a protocol. As shown in FIG. 8A, the terminal device may detect the F frames of the first signal, obtain the NPBCH in a subframe 0 of the frame 0, obtain the NPSS in a subframe 5 of the frame 0, and obtain the NSSS in a subframe 9 of the frame 0.

Step 303: The terminal device performs detection based on the frame number of the first resource to obtain the second resource.

The second resource herein may be the same as the first resource. An implementation in which detection is performed based on the frame number of the first resource to obtain the second resource is specifically described below.

If the terminal device detects the first signal to obtain the first resource, and the frame number of the first resource is N1, the terminal device may detect an $(N1+F*N)^{th}$ frame of the first signal to obtain the second resource. N=1, 2, . . . . For example, the frame number of the first resource is N1, and the terminal device may detect an $(N1+F)^{th}$ frame, an $(N1+2F)^{th}$ frame, an $(N1+3F)^{th}$ frame, . . . , and an $(N1+F*N)^{th}$ frame to obtain the second resource.

As shown in FIG. 6, the terminal device receives a first signal sent by the cell 1, and the terminal device may detect four frames of the first signal to obtain the first resource. A frame number of the first resource is a frame 0. Therefore, the terminal device may detect a $(0+4*1)^{th}$ frame, that is, a frame 4, and a $(0+4*2)^{th}$ frame, that is, a frame 8 of the first signal to obtain the second resource. By analogy, the terminal device may further detect a frame 12 (not shown in the figure), a frame 16 (not shown in the figure), and a frame 0+4*N of the first signal to obtain the second resource. If the terminal device receives a first signal sent by the cell 2, the terminal device may detect four frames of the first signal to obtain the first resource. A frame number of the first resource is a frame 1. Therefore, the terminal device may detect a $(1+4*1)^{th}$ frame, that is, a frame 5, and a $(1+4*2)^{th}$ frame, that is, a frame 9 (not shown in the figure) of the first signal to obtain the second resource. By analogy, the terminal device may further detect a frame 13 (not shown in the figure), a frame 17 (not shown in the figure), and a frame 1+4*N of the first signal to obtain the second resource. If the terminal device receives a first signal sent by the cell 3, the terminal device may detect four frames of the first signal to obtain the first resource. A frame number of the first resource is a frame 2. Therefore, the terminal device may detect a $(2+4*1)^{th}$ frame, that is, a frame 6, and a $(2+4*2)^{th}$ frame, that is, a frame 10 (not shown in the figure) of the first signal to obtain the second resource. By analogy, the terminal device may further detect a frame 14 (not shown in the figure), a frame 18 (not shown in the figure), and a frame 2+4*N of the first signal to obtain the second resource. If the terminal device receives a first signal sent by the cell 4, the terminal device may detect four frames of the first signal to obtain the first resource. A frame number of the first resource is a frame 3. Therefore, the terminal device may detect a $(3+4*1)^{th}$ frame, that is, a frame 7, of the first signal to obtain the second resource. By analogy, the terminal device may further detect a frame 11 (not shown in the figure), a frame 15 (not shown in the figure), and a frame 3+4*N of the first signal to obtain the second resource.

As shown in FIG. 7, if the terminal device receives a first signal sent by the cell 1, the terminal device may detect three frames of the first signal to obtain the first resource. A frame number of the first resource is a frame 0. Therefore, the terminal device may detect a $(0+3*1)^{th}$ frame, that is, a frame 3, and a $(0+3*2)^{th}$ frame, that is, a frame 6 of the first signal to obtain the second resource. By analogy, the terminal device may further detect a frame 9, a frame 12, and a frame 3N of the first signal to obtain the second resource. If the terminal device receives a first signal sent by the cell 2, the terminal device may detect three frames of the first signal to obtain the first resource. A frame number of the first resource is a frame 1. Therefore, the terminal device may detect a $(1+3*1)^{th}$ frame, that is, a frame 4, and a $(1+3*2)^{th}$ frame, that is, a frame 7 of the first signal to obtain the second resource. By analogy, the terminal device may further detect a frame 10, a frame 13, and a frame 1+3*N of the first signal to obtain the second resource. If the terminal device receives a first signal sent by the cell 3, the terminal device may detect three frames of the first signal to obtain the first resource. A frame number of the first resource is a frame 2. Therefore, the terminal device may detect a $(2+3*1)^{th}$ frame, that is, a frame 5, and a $(2+3*2)^{th}$ frame, that is, a frame 8 of the first signal to obtain the second resource. By analogy, the terminal device may further detect a frame 11, a frame 15, and a frame 2+3*N of the first signal to obtain the second resource.

The first resource and the second resource may be any one of or any combination of the NPSS, the NPBCH, or the NSSS. It should be understood that subframes that carry the first resource and the second resource may be specified in a protocol, or may be indicated by the network device. For example, the network device may indicate, by using first indication information, specific subframes in which the NPSS, the NSSS, and the NPBCH are separately carried.

As shown in FIG. 8A, the terminal device receives a first signal sent by the cell 1. The terminal device detects four frames of the cell 1 to obtain the first resource. A subframe 0 of a frame 0 carries the NPBCH, a subframe 5 of the frame 0 carries the NPSS, and a subframe 9 of the frame 0 carries the NSSS. Therefore, the terminal device may detect a $(0+4*1)^{th}$ frame, that is, a frame 4, of the first signal to obtain the second resource. Considering different periodicities of the NPBCH, the NPSS, and the NSSS, in this implementation, a subframe 0 of a frame 4N carries the NPBCH, a subframe 5 of the frame 4N carries the NPSS, and a subframe 9 of a frame 4*2*N carries the NSSS. It can be learned that when F=4, a frame length is 10 ms, and corresponding periodicities of the NPBCH, the NPSS, and the NSSS are respectively 2560 ms, 40 ms, and 80 ms.

As shown in FIG. 9A, the terminal device may receive a first signal sent by the cell 1. The terminal device may detect three frames of the cell 1 to obtain the first resource. A subframe 0 of a frame 0 carries the NPBCH, a subframe 5 of the frame 0 carries the NPSS, and a subframe 9 of the frame 0 carries the NSSS. Therefore, the terminal device may detect a $(0+3*1)^{th}$ frame, that is, a frame 3, of the first signal to obtain the second resource. A subframe 0 of the frame 3 carries the NPBCH, a subframe 5 of the frame 3 carries the NPSS, and a subframe 9 of the frame 3 carries the NSSS. By analogy, the terminal device may further detect a $(0+3*N)^{th}$ frame of the first signal to obtain the second resource. Considering different periodicities of the NPBCH, the NPSS, and the NSSS, in this implementation, a subframe 0 of a frame 3N carries the NPBCH, a subframe 5 of the frame 3N carries the NPSS, and a subframe 9 of a frame 3*2*N carries the NSSS.

As shown in FIG. 8A to FIG. 8D and FIG. 9A to FIG. 9C, all the NPBCH, the NPSS, and the NSSS are in a same frame of the first signal. In this embodiment of this application, the NPBCH, the NPSS, and the NSSS may alternatively be in different frames of the first signal. As shown in FIG. 10, the terminal device receives a first signal sent by the cell 1. The terminal device detects four frames of the first signal to obtain the NPBCH. A frame number of the NPBCH is a frame 0, and therefore the terminal device may detect a $(0+4*1)^{th}$ frame, that is, a frame 4, of the first signal to obtain the NPBCH. By analogy, the terminal device may further detect a frame 8, a frame 12, and a frame 4*N of the first signal to obtain the NPBCH.

As shown in FIG. 10, the terminal device detects four frames of the first signal to obtain the NPSS. Frame numbers of the NPSS are a frame 0 and a frame 1. Because two frames in the four frames of the first signal carry the NPSS, the terminal device may detect a $(0+4*2)^{th}$ frame, that is, a frame 8, of the first signal to obtain the NPSS, and detect a $(1+4*2)^{th}$ frame, that is, a frame 9, of the first signal to obtain the NPSS. By analogy, if M frames in the F frames of the first signal carry the NPSS, the terminal device may detect an $(N1+F*(N+M-1))^{th}$ frame of the first signal to obtain the NPSS. M is a positive integer. As shown in FIG. 10, the terminal device may detect four frames of the first signal to obtain the NSSS. A frame number of the NSSS is a frame 1. Therefore, considering a periodicity of the NSSS, the terminal device may detect a $(1+4*2)^{th}$ frame, that is, a frame 9, and a $(1+F*2*N)^{th}$ frame of the first signal to obtain the NSSS.

In this embodiment of this application, the first signal may be detected in a time domain dilution manner to obtain the first resource. For example, the terminal device may detect a specified time domain symbol in the F frames to obtain the first resource.

For example, content transmitted in S1=(3, 4, 5, 6, 9, 10, 11)$^{th}$ time domain symbols by the NPSS is the same, and content transmitted in S2=(7, 8, 12)$^{th}$ time domain symbols is the same. Therefore, the network device may combine the S1$^{th}$ time domain symbol and the S2$^{th}$ time domain symbol, and the specified time domain symbol in the F frames carries the first resource. When detecting the first signal, the terminal device may also obtain the first resource on the specified time domain symbol in the F frames. For example, when the multiplexing factor F is 3, the first resource may be carried on third, fourth, and seventh time domain symbols of a frame A of the first signal of the cell 1. The terminal device may detect third, fourth, and seventh time domain symbols in the F frames to obtain the first resource. The terminal device may further detect third, fourth, and seventh time domain symbols of an (A+3*N)$^{th}$ frame of the first signal to obtain the second resource.

Optionally, as shown in FIG. 2, there may be a plurality of time domain symbols in one subframe of each frame of the first signal. The terminal device may further detect a specified time domain symbol of a first frame of the first signal to obtain the first resource, and detect a specified time domain symbol of each frame except the first frame of the first signal to obtain the second resource. For example, when the multiplexing factor F is 3, the terminal device may detect third, fourth, and seventh time domain symbols of the first frame of the first signal to obtain the first resource, and detect third, fourth, and seventh time domain symbols of each frame except the first frame of the first signal to obtain the second resource.

In another possible implementation, the terminal device may alternatively detect the first signal in a frequency domain dilution manner to obtain the first resource. For example, the terminal device may detect a specified carrier in the F frames to obtain the first resource.

For example, the NPSS occupies 11 subcarriers in frequency domain. Therefore, transmission bandwidth of the NPSS can be reduced in the frequency domain dilution manner. For example, when the multiplexing factor F is 4, the terminal device may detect subcarriers (1, 2) of a frame A to obtain the first resource. Therefore, the terminal device may detect subcarriers (1, 2) of a frame A+4*N to obtain the second resource. Alternatively, when the multiplexing factor F is 4, the terminal device may detect subcarriers (4, 5) of a frame B to obtain the first resource. Therefore, the terminal device may detect subcarriers (4, 5) of a frame B+4*N to obtain the second resource. For another example, the NSSS occupies 12 subcarriers in frequency domain. Transmission bandwidth of the NSSS can also be reduced in the frequency domain dilution manner. For example, when the multiplexing factor F is 3, the terminal device may detect subcarriers (1, 4, 7, 10) of the frame A to obtain the first resource. Therefore, the terminal device may detect subcarriers (1, 4, 7, 10) of a frame A+3*N to obtain the second resource.

For example, the terminal device may further detect a specified time domain symbol and a specified subcarrier in the F frames of the first signal to obtain the first resource. For example, when the multiplexing factor F is 3, the terminal device may obtain a first NPSS by performing detection on third, fourth, and seventh time domain symbols and subcarriers (1, 2) of a frame A. The terminal device may further obtain a second NPSS by performing detection on third, fourth, and seventh time domain symbols and subcarriers (1, 2) of a frame A*3*N.

Optionally, as shown in FIG. 2, there may be a plurality of subcarriers in one subframe of each frame of the first signal. The terminal device may further detect a specified subcarrier of a first frame of the first signal to obtain the first resource, and detect a specified subcarrier of each frame except the first frame of the first signal to obtain the second resource. For example, when the multiplexing factor F is 4, the terminal device may detect subcarriers (1, 2) of the first frame of the first signal to obtain the first resource, and the terminal device may further detect subcarriers (1, 2) of each frame except the first frame of the first signal to obtain the second resource.

For example, the terminal device may also transmit the first resource and the second resource by using a combination of time domain dilution and frequency domain dilution. As shown in FIG. 2, the terminal device may further detect a specified time domain symbol and a specified subcarrier of a first frame of the first signal to obtain the first resource, and detect a specified time domain symbol and a specified subcarrier of each frame except the first frame of the first signal to obtain the second resource. For example, when the multiplexing factor F is 3, the terminal device may detect third, fourth, and seventh time domain symbols and subcarriers (1, 2) of the first frame of the first signal to obtain the first NPSS, and detect third, fourth, and seventh time domain symbols and subcarriers (1, 2) of each frame except the first frame of the first signal to obtain a second NPSS.

The communication method in embodiments of this application is described above, and a communication apparatus in embodiments of this application is described below. The method and the apparatus are based on a same inventive concept. Because the method and the apparatus have a similar problem-resolving principle, for implementations of the apparatus and the method, refer to each other, and no repeated description is provided.

Figure 12:
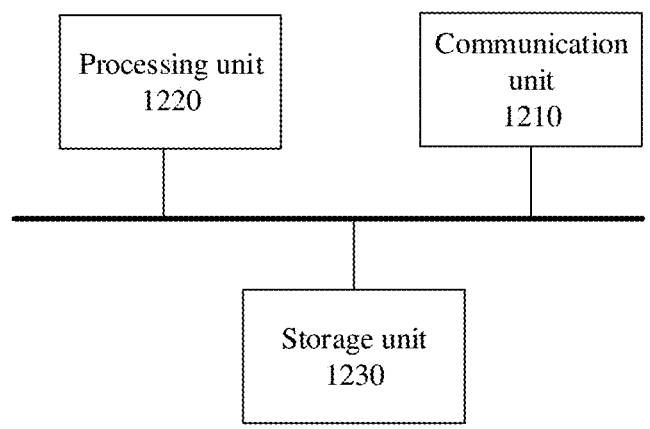
FIG. 12 is a schematic diagram of a communication apparatus according to an embodiment of this application.

Based on a same technical concept as the foregoing communication method, as shown in FIG. 12, a communication apparatus 1200 is provided. The communication apparatus 1200 can perform steps performed by the terminal device in the foregoing method. To avoid repetition, details are not described herein again. The communication apparatus 1200 includes a communication unit 1210 and a processing unit 1220. Optionally, the communication apparatus 1200 further includes a storage unit 1230. The processing unit 1220 may be separately connected to the storage unit 1230 and the communication unit 1210, and the storage unit 1230 may also be connected to the communication unit 1210.

The storage unit 1230 is configured to store a computer program.

For example, the communication unit 1210 is configured to receive a first signal.

The processing unit 1220 is configured to: detect F frames of the first signal to obtain a first resource, and perform detection based on a frame number of the first resource to obtain a second resource. F is a multiplexing factor. For descriptions of the multiplexing factor F, the first resource, the second resource, a frame number of the first resource, and a frame number of the second resource, refer to related descriptions in the foregoing method embodiment shown in FIG. 3. Details are not described herein again.

In a possible implementation, when detecting the F frames of the first signal to obtain the first resource, the processing unit 1220 is specifically configured to detect the F frames of the first signal to obtain an NPSS. The processing unit 1220 obtains an NSSS and an NPBCH based on the NPSS. For descriptions of the NPSS, the NSSS, and the NPBCH, refer to related descriptions in the foregoing method embodiment shown in FIG. 3.

In a possible implementation, when performing detection based on the frame number of the first resource to obtain the second resource, the processing unit 1220 is specifically configured to obtain the second resource in an $(N1+F*N)^{th}$ frame, where N1 is the frame number of the first resource, and N is a positive integer. F may be 3, or F may be 4. For related descriptions, refer to descriptions in the foregoing method embodiment shown in FIG. 3.

In a possible implementation, when detecting the F frames of the first signal to obtain the first resource, the processing unit 1220 is specifically configured to detect time domain symbols of the F frames to obtain the first resource. When performing detection based on the frame number of the first resource to obtain the second resource, the processing unit 1220 is specifically configured to perform detection based on the frame number of the first resource and a time domain symbol of the first resource to obtain the second resource.

In a possible implementation, when detecting the F frames of the first signal to obtain the first resource, the processing unit 1220 is specifically configured to detect subcarriers of the F frames to obtain the first resource. When performing detection based on the frame number of the first resource to obtain the second resource, the processing unit 1220 is specifically configured to perform detection based on the frame number of the first resource and a subcarrier of the first resource to obtain the second resource.

The communication apparatus may alternatively be a chip. The communication unit may be an input/output circuit or an interface of the chip, the processing unit may be a logic circuit, and the logic circuit may process to-be-processed data based on the steps described in the foregoing method aspect to obtain processed data. The to-be-processed data may be data received by an input circuit/interface, for example, the first signal. The processed data may be data obtained based on the to-be-processed data, for example, the first resource and the second resource. An output circuit/interface is configured to output the processed data.

Figure 13:
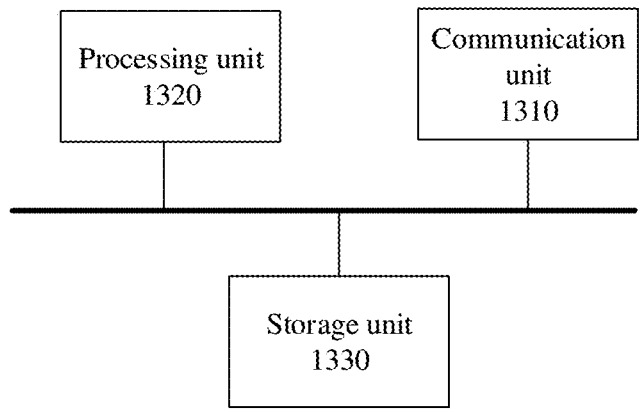
FIG. 13 is a schematic diagram of a communication apparatus according to an embodiment of this application.

Based on a same technical concept as the foregoing communication method, as shown in FIG. 13, a communication apparatus 1300 is provided. The communication apparatus 1300 can perform steps performed by the network device in the foregoing method. To avoid repetition, details are not described herein again. The communication apparatus 1300 includes a communication unit 1310 and a processing unit 1320. Optionally, the communication apparatus 1300 further includes a storage unit 1330. The processing unit 1320 may be separately connected to the storage unit 1330 and the communication unit 1310, and the storage unit 1330 may also be connected to the communication unit 1310.

The storage unit 1330 is configured to store a computer program.

For example, the processing unit 1320 is configured to send a first signal based on the communication unit 1310. F frames of the first signal carry a first resource, and F is a multiplexing factor. The first signal further carries a second resource, and a frame number of the first resource is related to a frame number of the second resource. For descriptions of the multiplexing factor F, the first resource, the second resource, the frame number of the first resource, and the frame number of the second resource, refer to related descriptions in the foregoing method embodiment shown in FIG. 3.

The communication apparatus may alternatively be a chip. The communication unit may be an input/output circuit or an interface of the chip, the processing unit may be a logic circuit, and the logic circuit may process to-be-processed data based on the steps described in the foregoing method aspect to obtain processed data.

An embodiment of this application further provides a communication apparatus. The communication apparatus may be a terminal device, or may be a circuit. The communication apparatus may be configured to perform an action performed by the terminal device in the foregoing method embodiments.

Figure 14:
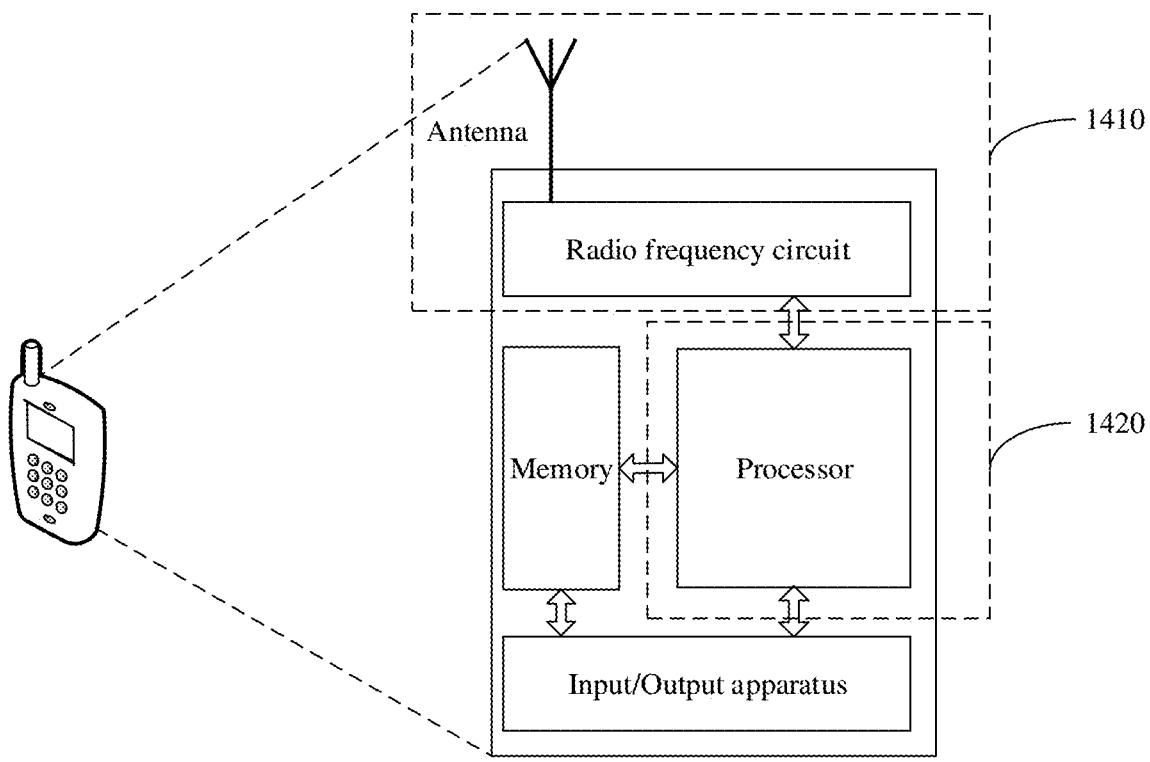
FIG. 14 is a schematic diagram of a communication apparatus according to an embodiment of this application.

When the communication apparatus is a terminal device, FIG. 14 is a schematic diagram of a simplified structure of the terminal device. For ease of understanding and convenience of graphical representation, in FIG. 14, a mobile phone is used as an example of the terminal device. As shown in FIG. 14, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store a software program and data. The radio frequency circuit is mainly configured to perform conversion between a baseband signal and a radio frequency signal and process the radio frequency signal. The antenna is mainly configured to receive and send radio frequency signals in a form of an electromagnetic wave. The input/output apparatus, for example, a touchscreen, a display, or a keyboard, is mainly configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, only one memory and one processor are shown in FIG. 14. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a receiving/sending function may be considered as a communication unit of the terminal device, and the processor that has a processing function is considered as a processing unit of the terminal device. As shown in FIG. 14, the terminal device includes a communication unit 1410 and a processing unit 1420. The communication unit may also be referred to as a transceiver, a transceiver apparatus, or the like. The processing unit may also be referred to as a processor, a processing board, a processing module, a processing apparatus, or the like. Optionally, a component configured to implement a receiving function in the communication unit 1410 may be considered as a receiving unit, and a component configured to implement a sending function in the communication unit 1410 may be considered as a sending unit; in other words, the communication unit 1410 includes a receiving unit and a sending unit. The communication unit sometimes may also be referred to as a transceiver, a transceiver apparatus, or the like. The receiving unit sometimes may also be referred to as a receive machine, a receiver, a receive circuit, or the like. The sending unit sometimes may also be referred to as a transmit machine, a transmitter, a transmit circuit, or the like.

It should be understood that the communication unit 1410 is configured to perform a sending operation and a receiving operation on a terminal device side in the foregoing method embodiment, and the processing unit 1420 is configured to perform another operation on the terminal device in the foregoing method embodiment except the receiving/sending operation.

For example, in an implementation, the communication unit 1410 is configured to perform a receiving operation on the terminal device side in step 301 in FIG. 3, and/or the communication unit 1410 is further configured to perform another receiving/sending step on the terminal device side in this embodiment of this application. The processing unit 1420 is configured to perform step 302 and/or step 303 in FIG. 3, and/or the processing unit 1420 is further configured to perform another processing step on the terminal device side in this embodiment of this application.

When the terminal device is a chip-type apparatus or circuit, the apparatus may include a communication unit and a processing unit. The communication unit may be an input/output circuit and/or a communication interface. The processing unit is an integrated processor, a microprocessor, or an integrated circuit.

Figure 15:
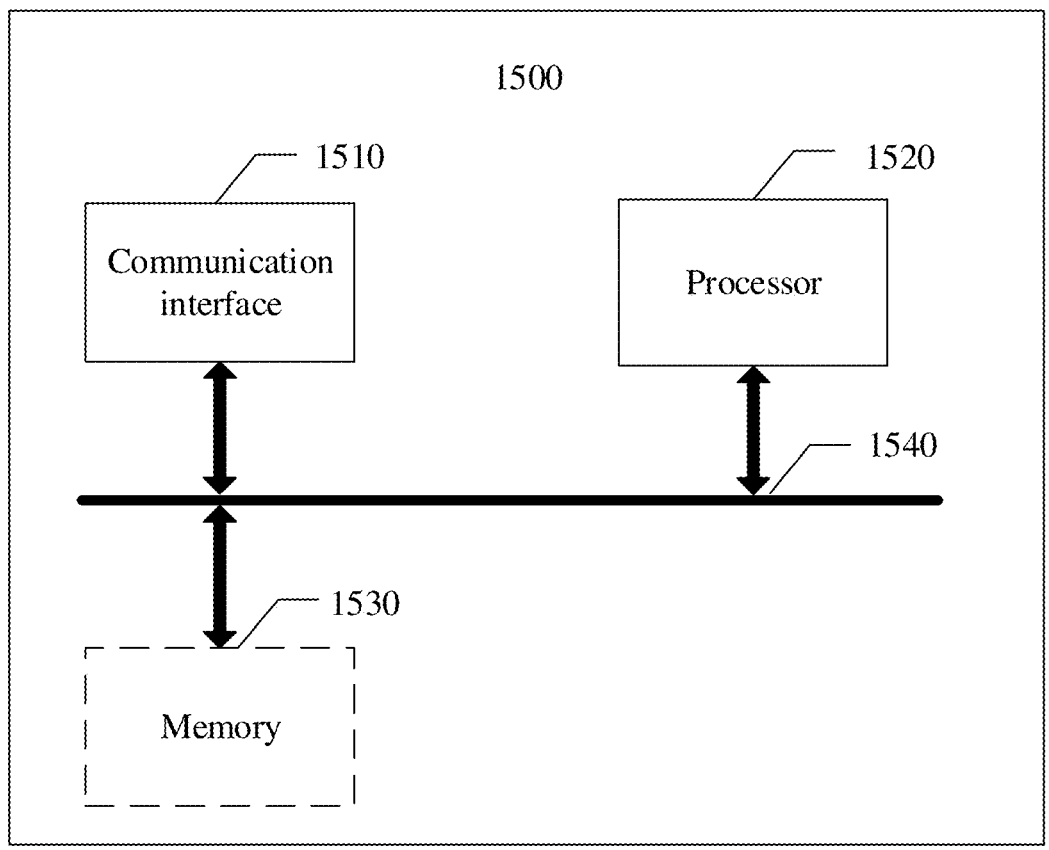
FIG. 15 is a block diagram of a communication apparatus according to an embodiment of this application.

FIG. 15 shows a communication apparatus 1500 according to an embodiment of this application, and the communication apparatus 1500 is configured to implement functions of the terminal device and the network device in the foregoing method. The communication apparatus may be a terminal device or a network device, may be an apparatus of the terminal device or the network device, or may be an apparatus that can be used together with the terminal device or the network device.

The communication apparatus 1500 includes at least one processor 1520, configured to implement functions of the terminal device and the network device in the method provided in embodiments of this application. The communication apparatus 1500 may further include a communication interface 1510. In this embodiment of this application, the communication interface may be a transceiver, a circuit, a bus, a module, or another type of communication interface, and is configured to communicate with another device by using a transmission medium. For example, the communication interface 1510 may be used by an apparatus in the communication apparatus 1500 to communicate with another device. When the communication apparatus 1500 is a terminal device, the processor 1520 may complete a function of the processing unit 1220 shown in FIG. 12, and the communication interface 1510 may complete a function of the communication unit 1210 shown in FIG. 12. When the communication apparatus 1500 is a network device, the processor 1520 may complete a function of the processing unit 1320 shown in FIG. 13, and the communication interface 1510 may complete a function of the communication unit 1310 shown in FIG. 13.

The communication apparatus 1500 may further include at least one memory 1530, configured to store program instructions and/or data. The memory 1530 is coupled to the processor 1520. The coupling in this embodiment of this application is indirect coupling or a communication connection between apparatuses, units, or modules for information exchange between the apparatuses, the units, or the modules, and may be in electrical, mechanical, or other forms. The processor 1520 may cooperate with the memory 1530. The processor 1520 may execute the program instructions stored in the memory 1530. At least one of the at least one memory may be included in the processor.

A specific connection medium between the communication interface 1510, the processor 1520, and the memory 1530 is not limited in this embodiment of this application. In this embodiment of this application, in FIG. 15, the memory 1530, the processor 1520, and the communication interface 1510 are connected by using a bus 1540. The bus is represented by a bold line in FIG. 15. A connection manner between other components is merely a schematic description, and is not limited thereto. The bus may be classified into an address bus, a data bus, a control bus, and the like. For ease of representation, only one bold line is used for representation in FIG. 15, but this does not mean that there is only one bus or only one type of bus.

In another form of this embodiment, a computer-readable storage medium is provided, and instructions are stored on the computer-readable storage medium. When the instructions are executed, a method on a terminal device side or a network device side in the foregoing method embodiment is performed.

In another form of this embodiment, a computer program product including instructions is provided, and when the instructions are executed, a method on a terminal device side or a network device side in the foregoing method embodiment is performed.

In another form of this embodiment, a communication system is provided, and the system may include the foregoing at least one terminal device and the foregoing at least one network device.

It should be understood that, the processor mentioned in embodiments of the present invention may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory mentioned in embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (random access memory, RAM) and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification is intended to include but not limited to these memories and any memory of another appropriate type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by an apparatus, a first signal;
   detecting, by the apparatus, F frames of the first signal, to obtain a first resource, wherein F is a multiplexing factor indicating a quantity of adjacent network devices which multiplex the first resource, and F is a non-negative integer; and
   performing, by the apparatus, detection based on a frame number of the first resource, to obtain a second resource.

2. The method according to claim 1, wherein the first resource comprises at least one of the following:
   a narrowband primary synchronization signal (NPSS), a narrowband secondary synchronization signal (NSSS), or a narrowband physical broadcast channel (NPBCH).

3. The method according to claim 2, wherein detecting, by the apparatus, the F frames of the first signal, to obtain the first resource comprises:
   detecting, by the apparatus, the F frames of the first signal to obtain the NPSS; and
   obtaining, by the apparatus, the NSSS and the NPBCH based on the NPSS.

4. The method according to claim 3, wherein the NPSS, the NSSS, and the NPBCH are in a same frame of the first signal.

5. The method according to claim 1, wherein performing, by the apparatus, detection based on the frame number of the first resource, to obtain the second resource, comprises:
   obtaining, by the apparatus, the second resource in an $(N1+F*N)^{th}$ frame, wherein N1 is the frame number of the first resource, and N is a positive integer.

6. The method according to claim 5, wherein F is 3, or F is 4.

7. The method according to claim 1, wherein the multiplexing factor is related to a physical cell identifier of a network device.

8. The method according to claim 1, wherein detecting, by the apparatus, the F frames of the first signal, to obtain the first resource comprises:
   detecting, by the apparatus, time domain symbols of the F frames, to obtain the first resource; and
   wherein performing, by the apparatus, detection based on the frame number of the first resource to obtain the second resource comprises:
   performing, by the apparatus, detection based on the frame number of the first resource and the time domain symbol of the first resource, to obtain the second resource.

9. The method according to claim 1, wherein detecting, by the apparatus, the F frames of the first signal, to obtain the first resource, comprises:
    detecting, by the apparatus, subcarriers of the F frames to obtain the first resource; and
    wherein performing, by the apparatus, detection based on the frame number of the first resource to obtain the second resource comprises:
        performing, by the apparatus, detection based on the frame number of the first resource and the subcarrier of the first resource, to obtain the second resource.

10. An apparatus, comprising:
    a transceiver, configured to receive a first signal;
    at least one processor; and
    a non-transitory computer readable storage medium storing a program that is executable by the at least one processor, the program including instructions to:
        detect F frames of the first signal to obtain a first resource, wherein F is a multiplexing factor indicating a quantity of adjacent network devices which multiplex the first resource; and
        perform detection based on a frame number of the first resource to obtain a second resource.

11. The apparatus according to claim 10, wherein the first resource comprises at least one of the following:
    a narrowband primary synchronization signal (NPSS), a narrowband secondary synchronization signal (NSSS), or a narrowband physical broadcast channel (NPBCH).

12. The apparatus according to claim 11, wherein the instructions to detect the F frames of the first signal to obtain the first resource, comprise instructions to:
    detect the F frames of the first signal to obtain the NPSS; and
    obtain the NSSS and the NPBCH based on the NPSS.

13. The apparatus according to claim 11, wherein the NPSS, the NSSS, and the NPBCH are in a same frame of the first signal.

14. The apparatus according to claim 11, wherein the instructions to detect the F frames of the first signal to obtain the first resource, comprise instructions to:
    obtain the second resource in an $(N1+F*N)^{th}$ frame, wherein N1 is the frame number of the first resource, and N is a positive integer.

15. The apparatus according to claim 14, wherein F is 3, or F is 4.

16. The apparatus according to claim 11, wherein the multiplexing factor is related to a physical cell identifier of a network device.

17. The apparatus according to claim 11, wherein the instructions to detect the F frames of the first signal to obtain the first resource, comprise instructions to:
    detect time domain symbols of the F frames to obtain the first resource; and
    wherein the instructions to perform detection based on the frame number of the first resource to obtain the second resource comprise instructions to:
        perform detection based on the frame number of the first resource and the time domain symbol of the first resource to obtain the second resource.

18. The apparatus according to claim 11, wherein the instructions to detect the F frames of the first signal to obtain the first resource, comprise instructions to:
    detect subcarriers of the F frames to obtain the first resource; and
    wherein the instructions to perform detection based on the frame number of the first resource to obtain the second resource comprise instructions to:
        perform detection based on the frame number of the first resource and the subcarrier of the first resource to obtain the second resource.

19. An apparatus, comprising:
    at least one processor; and
    a non-transitory computer readable storage medium storing a program that is executable by the at least one processor, the program including instructions to:
        send a first signal, wherein F frames of the first signal carry a first resource, F is a multiplexing factor indicating a quantity of adjacent network devices which multiplex the first resource, the first signal further carries a second resource, and a frame number of the first resource is related to a frame number of the second resource.

20. The apparatus according to claim 19, wherein the first resource comprises at least one of the following:
    a narrowband primary synchronization signal (NPSS), a narrowband secondary synchronization signal (NSSS), or a narrowband physical broadcast channel (NPBCH).

* * * * *